(12) United States Patent
Nishina et al.

(10) Patent No.: US 11,225,121 B2
(45) Date of Patent: Jan. 18, 2022

(54) VEHICLE AIR CONDITIONER

(71) Applicant: SUBARU CORPORATION, Tokyo (JP)

(72) Inventors: Hirotake Nishina, Tokyo (JP); Takako Mizuno, Tokyo (JP); Hiroaki Mikami, Tokyo (JP); Yoshinori Tamura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 186 days.

(21) Appl. No.: 16/514,129

(22) Filed: Jul. 17, 2019

(65) Prior Publication Data

US 2019/0337356 A1 Nov. 7, 2019

Related U.S. Application Data

(62) Division of application No. 16/007,550, filed on Jun. 13, 2018, which is a division of application No. 15/261,586, filed on Sep. 9, 2016.

(30) Foreign Application Priority Data

Sep. 30, 2015 (JP) .................................. 2015-193058
Sep. 30, 2015 (JP) .................................. 2015-193059

(51) Int. Cl.
*B60H 1/00* (2006.01)
*B60H 1/24* (2006.01)
*B60H 1/22* (2006.01)

(52) U.S. Cl.
CPC ..... *B60H 1/00285* (2013.01); *B60H 1/00478* (2013.01); *B60H 1/00564* (2013.01);
(Continued)

(58) Field of Classification Search
CPC ............ B60H 1/00285; B60H 1/00478; B60H 1/00564; B60H 1/00828; B60H 1/00892;
(Continued)

(56) References Cited

U.S. PATENT DOCUMENTS 5,450,894 A 9/1995 Inoue et al.
5,921,100 A * 7/1999 Yoshinori ............ B60N 2/5628
62/244

FOREIGN PATENT DOCUMENTS

JP S60-54618 U 4/1985
JP H05-286346 A 11/1993
(Continued)

OTHER PUBLICATIONS

United States Office Action dated Mar. 18, 2019, in U.S. Appl. No. 16/007,550.
(Continued)

*Primary Examiner* — Allen R Schult
(74) *Attorney, Agent, or Firm* — McGinn I.P. Law Group, PLLC.

(57) ABSTRACT

A vehicle air conditioner, including a first duct having a first ventilation opening that is disposed on first side in a width direction of a seat provided in a vehicle, a second duct having a second ventilation opening that is disposed on second side in the width direction of the seat, the second side being opposite side of the first side, and a third duct having a third ventilation opening that is disposed in front of the seat.

9 Claims, 11 Drawing Sheets

(52) U.S. Cl.
CPC ..... *B60H 1/00828* (2013.01); *B60H 1/00892* (2013.01); *B60H 1/2225* (2013.01); *B60H 1/247* (2013.01); *B60H 2001/003* (2013.01)

(58) Field of Classification Search
CPC ................ B60H 1/22253; B60H 1/247; B60H 2001/003
USPC ......................................................... 454/120
See application file for complete search history.

(56) References Cited

FOREIGN PATENT DOCUMENTS

| JP | H 06-143975 A | 5/1994 |
|---|---|---|
| JP | H07-266841 A | 10/1995 |
| JP | 2004-175268 A | 6/2004 |
| JP | 2006-131106 A | 5/2006 |
| JP | 2008-265490 A | 11/2008 |
| JP | 2011-105120 A | 6/2011 |
| JP | 2014-151705 A | 8/2014 |
| JP | 2014-156154 A | 8/2014 |

OTHER PUBLICATIONS

United States Office Action dated Dec. 18, 2018, in U.S. Appl. No. 16/007,550.
U.S. Election of Species Requirement dated Apr. 11, 2018 in U.S. Appl. No. 15/261,586.
Japanese Office Action dated Oct. 18, 2016 with an English translation thereof.
Japanese Office Action dated Sep. 13, 2016 with an English translation thereof.
United States Office Action dated Mar. 18, 2019, in co-pending U.S. Appl. No. 15/261,586.
Chinese Office Action dated Oct. 29, 2018, in corresponding Chinese Patent Application No. 201610857341.X, with an English translation thereof.
United States Office Action dated Dec. 11, 2018, in co-pending U.S. Appl. No. 15/261,586.

\* cited by examiner

VEHICLE AIR CONDITIONER

CROSS-REFERENCE TO RELATED APPLICATIONS

The present application is a Divisional Application of U.S. patent application Ser. No. 16/007,550 filed on Jun. 13, 2018, which is a Divisional Application of U.S. patent application Ser. No. 15/261,586, filed on Sep. 9, 2016 which claims priority from Japanese Patent Application No. 2015-193058 filed on Sep. 30, 2015 and Japanese Patent Application No. 2015-193059 filed on Sep. 30, 2015, the entire contents of both of which are hereby incorporated by reference.

BACKGROUND

The technology relates to an air conditioner to be mounted on a vehicle such as an automobile.

A vehicle such as an automobile is provided with an air conditioner to adjust a temperature inside an occupant compartment. Such a vehicle air conditioner is designed to blow out air and thus generate and discharge a strong airflow from a ventilation opening disposed at a front part or any other part of the occupant compartment to thereby adjust the temperature of the occupant compartment as a whole.

For example, Japanese Unexamined Patent Application Publication (JP-A) No. 2011-105120 discloses a vehicle air conditioner in which a ventilation opening is so provided as to cause warm air to be blown out from the ventilation opening toward the lower body of an occupant, from the femoral part over the waist. Blowing the strong warm air onto the occupant directly in this way makes it possible to warm the occupant directly.

SUMMARY

A vehicle air conditioner disclosed in JP-A No. 2011-105120 disposes a ventilation opening in front of a seated occupant such that the ventilation opening faces the rear. In such a situation, when warm air is blown onto the occupant from the ventilation opening disposed in front of the occupant, the warm air travels along the lower body from the femoral part over the waist of the occupant, following which the warm air travels upward along the upper body of the occupant. This may cause the warm air to be blown onto the head such as the face of the occupant, which may possibly give the occupant a sense of discomfort.

It is desirable to provide a vehicle air conditioner that makes it possible to adjust a temperature felt by an occupant while restraining a sense of discomfort given to the occupant.

An aspect of the technology provides a vehicle air conditioner that includes: a first duct having a first ventilation opening that is disposed on first side in a width direction of a seat provided in a vehicle, in which the second side is opposite side of the first side; a second duct having a second ventilation opening that is disposed on second side in the width direction of the seat; and a third duct having a third ventilation opening that is disposed in front of the seat.

DETAILED DESCRIPTION

In the following, some implementations of the technology are described in detail with reference to the drawings. The description is given in the following order.
1. Vehicle Air Conditioner (First Implementation)
    1-1. First Configuration Example
    1-2. Second Configuration Example
    1-3. Third Configuration Example
    1-4. Fourth Configuration Example
2. Vehicle Air Conditioner (Second Implementation)
    2-1. First Configuration Example
    2-2. Second Configuration Example

[1. Vehicle Air Conditioner (First Implementation)]

A description is given first of a vehicle air conditioner according to a first implementation of the technology. In the following description, the "vehicle air conditioner" may be simply referred to as an "air conditioner". The air conditioner may have any one of configurations to be described in first to fourth configuration examples as follows.

[1-1. First Configuration Example]

First, a description is given of an air conditioner 2 according to a first configuration example.

[Configuration of Vehicle to which Air Conditioner is Applied]

A vehicle 1 to which the air conditioner 2 according to the first configuration example is applied may include a configuration as described below.

Figure 1A:
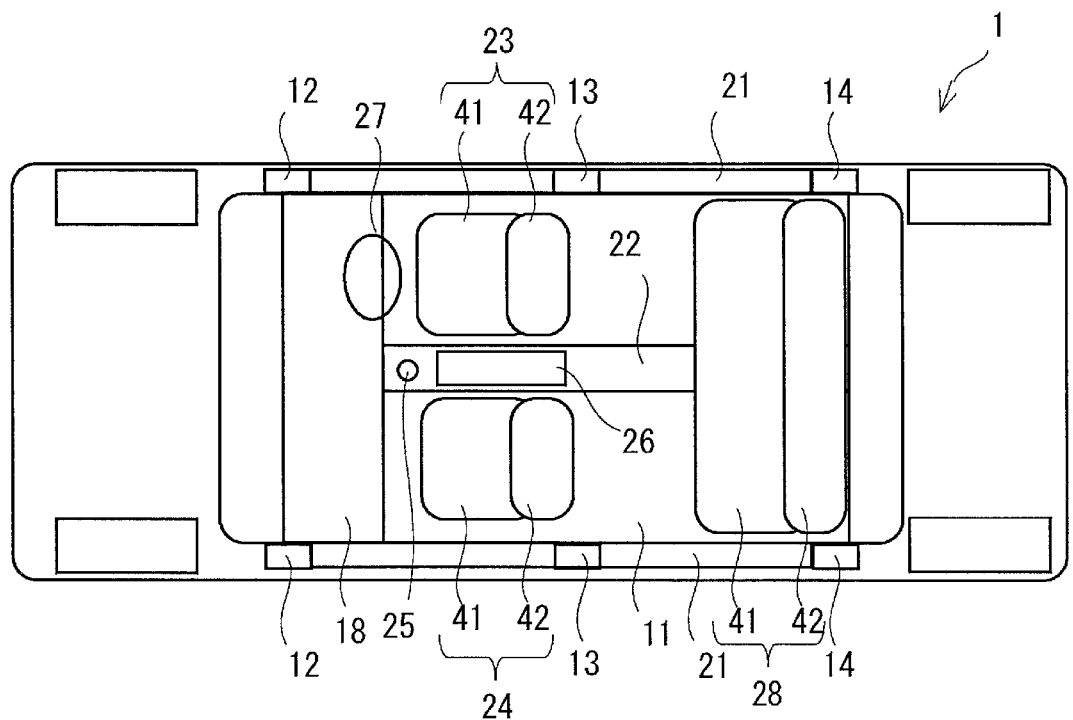
FIG. 1A is a schematic top view of a configuration of a vehicle to which an air conditioner according to a first implementation (a first configuration example) of the technology is applied.
Figure 1B:
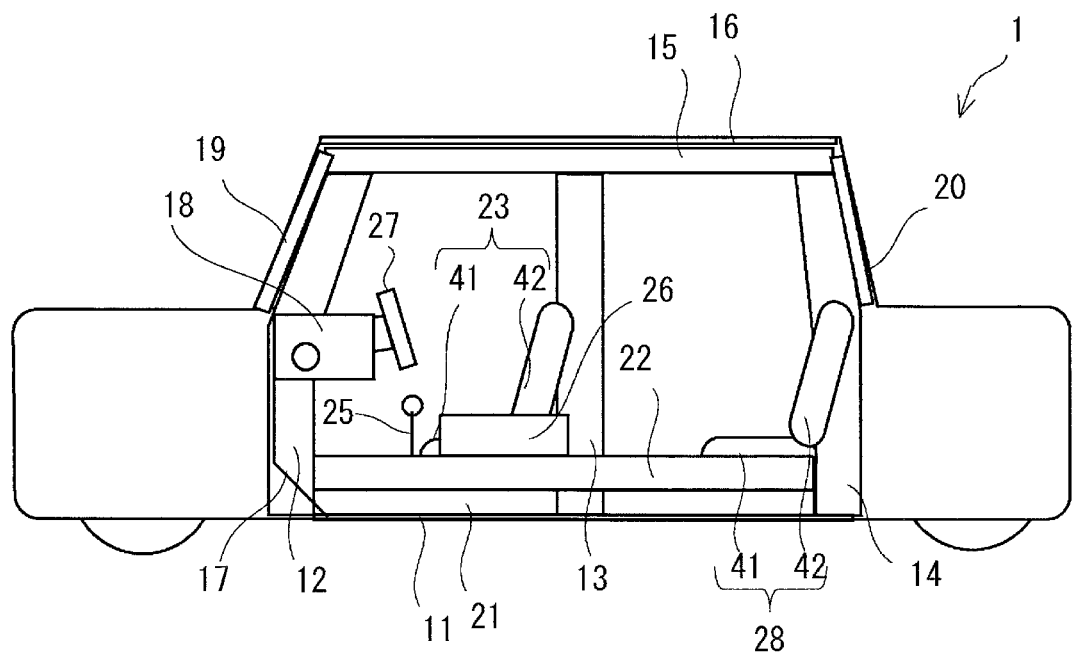
FIG. 1B is a schematic side view of the configuration of the vehicle to which the air conditioner according to the first implementation (the first configuration example) of the technology is applied.

FIG. 1A and FIG. 1B each schematically illustrate a configuration of the vehicle 1 to which the air conditioner 2 according to the first configuration example is applied, in which FIG. 1A is a top view of the vehicle 1 and FIG. 1B is a side view of the vehicle 1.

Note that directions and dimensions in FIGS. 1A and 1B are defined as follows. The left side and the right side of FIGS. 1A and 1B are respectively defined as "front" and "rear" including their variants. The upper side and the lower side of FIG. 1B are respectively defined as "up" and "down" including their variants. Further, a dimension in the up-down direction in FIG. 1A is defined as a "width", whereas a dimension in the up-down direction in FIG. 1B is defined as a "height". These definitions apply to FIG. 2 and any subsequent drawing as well.

The vehicle 1 may be any vehicle and its type is not particularly limited. The vehicle 1 to be described herein may be an automobile without limitation. An occupant compartment designed to allow an occupant to board the vehicle 1 may be provided at a substantially middle part in the front-rear direction of the vehicle 1. A front chamber designed to accommodate a fuel engine, etc., may be provided at a front part of the vehicle 1. A rear chamber available as a luggage compartment, etc., may be provided at a rear part of the vehicle 1.

The occupant compartment may include a floor panel 11, a pair of A-pillars 12, a pair of B-pillars 13, and a pair of C-pillars 14. The floor panel 11 may have a shape such as a substantially quadrangle shape. The A-pillars 12 may stand at respective front corners of the floor panel 11. The B-pillars 13 may stand at respective ends that are located at a substantially middle part in the front-rear direction of the floor panel 11. The C-pillars 14 may stand at respective rear corners of the floor panel 11. The pair of A-pillars 12 and the pair of C-pillars 14 may be coupled to each other through a pair of roof rails 15. The B-pillars 13 each may be joined to a substantially middle part in the front-rear direction of corresponding one of the roof rails 15. A roof panel 16 may be disposed between the roof rails 15. The roof panel 16 may have a shape such as a substantially quadrangle shape, and may be joined to the roof rails 15.

For example, a toe board 17 may be disposed between the floor panel 11 and the pair of A-pillars 12, and a dashboard 18 may be disposed above the toe board 17. A windshield 19 may be fitted in space surrounded by the dashboard 18, the pair of A-pillars 12, and the roof panel 16. A rear window 20 may be fitted in space between the pair of C-pillars 14.

A pair of front doors may be disposed between the pair of A-pillars 12 and the pair of B-pillars 13. The front doors each may be pivotably supported by corresponding one of the A-pillars 12. A pair of rear doors may be disposed between the pair of B-pillars 13 and the pair of C-pillars 14. The rear doors each may be pivotably supported by corresponding one of the B-pillars 13. Note that the front doors and the rear doors are unillustrated in FIGS. 1A and 1B. A pair of side sills 21 may be joined to both ends in the width direction of the floor panel 11.

The occupant compartment provided in the vehicle 1 may thus form a box-like space having a stereoscopic shape such as a substantially rectangular parallelepiped shape.

A center tunnel 22 may be provided at the substantially middle part in the width direction of the floor panel 11. For example, the center tunnel 22 may protrude toward inside of the occupant compartment, and extend in the front-rear direction. A drive shaft designed to transmit drive force derived from the fuel engine to rear wheels, and any other member, may be disposed below the center tunnel 22.

Front seats may be attached to a front part of the floor panel 11. For example, the front seats may include two seats, i.e., a driver's seat 23 and a navigator's seat 24, which are disposed side-by-side in the width direction. The driver's seat 23 may be available for a driver, whereas the navigator's seat 24 may be available for a fellow passenger who travels with the driver. For example, the driver's seat 23 may include a seating section 41 and a backrest section 42 attached to the seating section 41. The navigator's seat 24 may include the seating section 41 and the backrest section 42 as with the driver's seat 23, for example. The center tunnel 22 described above may be disposed between the seating section 41 of the driver's seat 23 and the seating section 41 of the navigator's seat 24. A shift lever 25, a parking brake lever, a console box 26 that serves as an interior member, etc., may be disposed above the center tunnel 22. The console box 26 may be disposed on first side of the navigator's seat 24, e.g., on the side close to the center of the occupant compartment. Note that the parking brake lever is unillustrated in FIGS. 1A and 1B.

For example, the dashboard 18 extending in the width direction may be disposed in front of each of the driver's seat 23 and the navigator's seat 24. A steering wheel 27 may be so disposed in front of the driver's seat 23 as to protrude rearward from the dashboard 18.

A rear seat may be attached to a rear part of the floor panel 11. For example, the rear seat may include a single seat, i.e., a bench seat 28, which may be available for multiple occupants. The bench seat 28 may include the seating section 41 and the backrest section 42 as with the driver's seat 23 described above, and may have a width equivalent to a width of the floor panel 11, for example. The bench seat 28 as a seat available for the multiple occupants as mentioned above may allow for seating, for example, up to three occupants.

In general, a vehicle such as an automobile often employs the fuel engine as a power source. However, a hybrid drive system that combines the fuel engine and an electric motor may sometimes be employed to address regulations on carbon dioxide emissions or any other requirement. Sometimes, the electric motor may be employed alone as the power source to address the regulations or any other requirement.

The vehicle that utilizes the electric motor may have no fuel engine mounted thereon which serves both as a heat source and the power source. There is also a case where the vehicle is mounted with the fuel engine, but the fuel engine does not operate constantly. In such cases, electric power derived from a battery mounted on the vehicle is used to provide cool air or warm air for air conditioning of the occupant compartment. However, consuming the electric power of the battery mounted on the vehicle for purpose of air conditioning may lead to a decrease in mileage of the vehicle and may arise a necessity to suppress traveling performance of the vehicle such as speed.

What is needed in an air conditioner for the vehicle is to improve consumption energy of the air conditioner. In particular, an occupant who uses the vehicle tends to feel cold in the lower body such as the toes in winter months, for example.

One implementation therefore proposes the air conditioner 2 that makes it possible to achieve air conditioning for each occupant, instead of air-conditioning the inside of the occupant compartment provided in the vehicle 1 as a whole. The air conditioner 2 may be a so-called personal air conditioner. Using the air conditioner 2 makes it possible to reduce a necessity of air-conditioning the inside of the occupant compartment as a whole. Further, combined use of an air conditioner that performs air-conditioning of the inside of the occupant compartment as a whole and the air conditioner 2 according to the implementation allows for a reduction in the consumption energy of the air conditioner 2 as well, owing to a reduction in a burden of performing the air-conditioning of the inside of the occupant compartment as a whole.

[Configuration of Air Conditioner]

The air conditioner 2 according to the first configuration example may have a configuration as described below.

Figure 2:
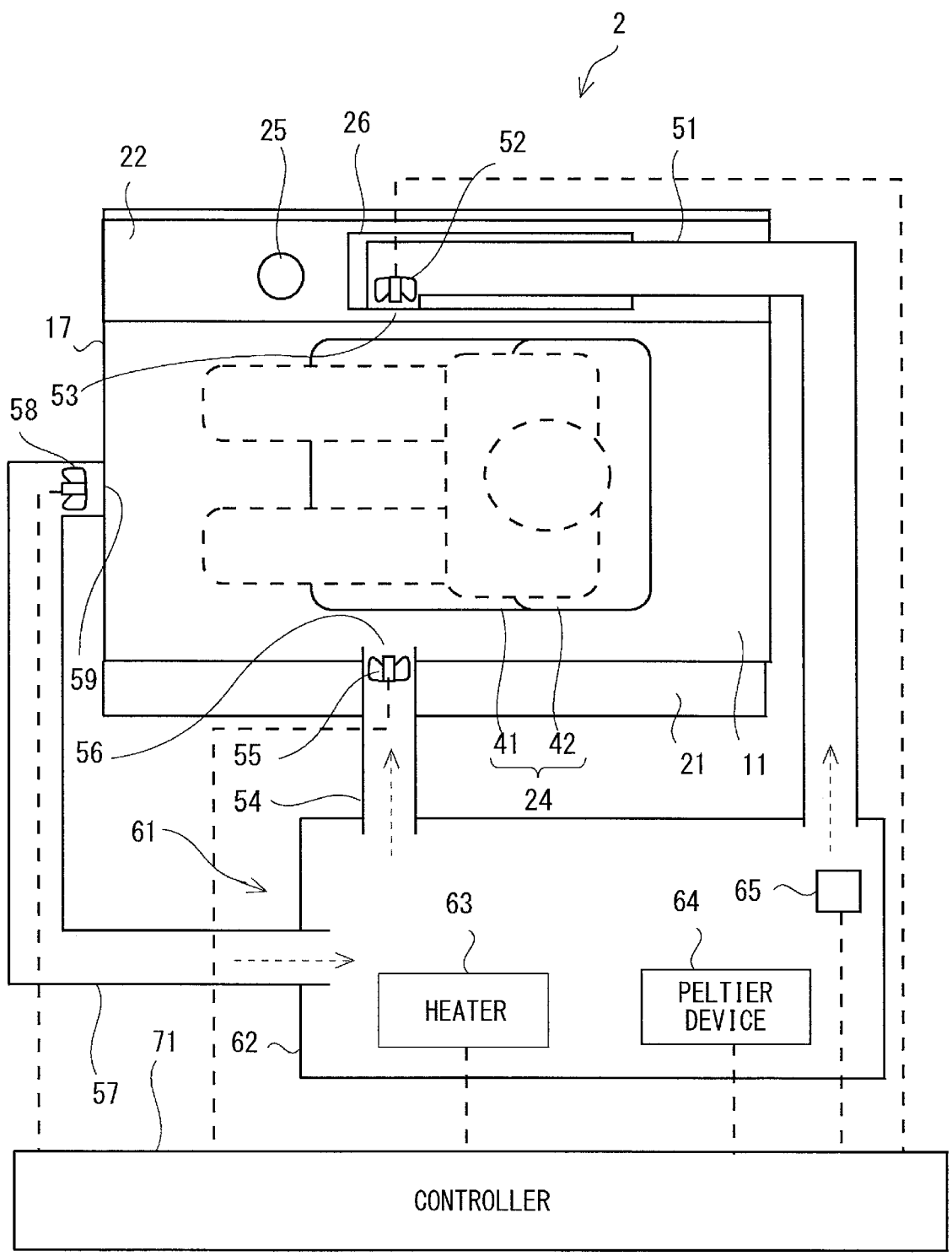
FIG. 2 is a top view of a configuration of the air conditioner according to the first implementation (the first configuration example) of the technology.

FIG. 2 is a top view of the configuration of the air conditioner 2 according to the first configuration example.

The air conditioner 2 may include an inner duct 51, an inner fan 52, an outer duct 54, an outer fan 55, a front duct 57, a front fan 58, a temperature controller 61, and a controller 71. In one implementation of the technology, the inner duct 51, the outer duct 54, and the front duct 57 may respectively serve as a "first duct", a "second duct", and a "third duct".

The temperature controller 61 may have a heater 63, a Peltier device 64, a temperature sensor 65, etc., inside a unit box 62. The heater 63 may heat air inside the unit box 62 by means of electric power of a battery mounted on the vehicle 1. The Peltier device 64 may cool the air inside the unit box 62 by means of the electric power of the battery mounted on the vehicle 1. The temperature controller 61 may be coupled to a duct of any other air conditioner that performs air conditioning of the inside of the occupant compartment as a whole, and may thereby receive a supply of warmed air or cooled air from that air conditioner. The temperature controller 61 may also receive a supply of warming medium such as warm water or refrigerant such as cooling water from the fuel engine or any other member. The temperature sensor 65 may detect a temperature of the air inside the unit box 62.

The inner duct 51 may include a first end having an inner ventilation opening 53, and a second end coupled to the unit box 62 of the temperature controller 61. In one implementation of the technology, the inner ventilation opening 53 may serve as a "first ventilation opening". A wind direction adjuster such as a louver may be provided at the inner ventilation opening 53. The inner fan 52 may be provided inside the inner duct 51. For example, the inner fan 52 may allow the inner duct 51 to take in air at low speed and blow out the air at low speed.

The outer duct 54 may include a first end having an outer ventilation opening 56, and a second end coupled to the unit box 62 of the temperature controller 61. In one implementation of the technology, the outer ventilation opening 56 may serve as a "second ventilation opening". A wind direction adjuster such as a louver may be provided at the outer ventilation opening 56. The outer fan 55 may be provided inside the outer duct 54. For example, the outer fan 55 may allow the outer duct 54 to take in air at low speed and blow out the air at low speed.

The front duct 57 may include a first end having a front ventilation opening 59, and a second end coupled to the unit box 62 of the temperature controller 61. In one implementation of the technology, the front ventilation opening 59 may serve as a "third ventilation opening". A wind direction adjuster such as a louver may be provided at the front ventilation opening 59. The front fan 58 may be provided inside the front duct 57. For example, the front fan 58 may allow the front duct 57 to take in air at low speed.

The controller 71 may control an operation of the air conditioner 2. The controller 71 may include a device such as a microcomputer. The controller 71 may be integrated with any other controller provided in the vehicle 1 to configure a single microcomputer. The microcomputer may be, for example, an engine control unit (ECU) or any other suitable device. The controller 71 may be coupled to the heater 63, the Peltier device 64, the temperature sensor 65, the inner fan 52, the outer fan 55, the front fan 58, etc.

The air conditioner 2 may be provided for each of the seats on which the respective occupants are to be seated. In one implementation, the air conditioner 2 may be provided for the navigator's seat 24.

In one specific but non-limiting example, the inner ventilation opening 53 may be disposed at a location that is on the first side in the width direction of the navigator's seat 24, e.g., on the side close to the console box 26, and that is on a side face of the console box 26, for example. The side face of the console box 26 may be located on the side close to the navigator's seat 24. In other words, the inner ventilation opening 53 may be provided separately from the navigator's seat 24. For example, the inner ventilation opening 53 may be disposed at a position higher than a position of the seating section 41 (a seating surface) of the navigator's seat 24.

The outer ventilation opening 56 may be disposed at a location that is on second side in the width direction of the navigator's seat 24, e.g., on the side far from the console box 26, for example. In other words, the outer ventilation opening 56 may be provided separately from the navigator's seat 24. The outer ventilation opening 56 may be disposed at a position that is on the outside of the seating section 41 of the navigator's seat 24, i.e., on the side far from the center of the vehicle 1 in the width direction, and that is higher than the position of the seating section 41 (the seating surface).

The front ventilation opening 59 may be disposed in front of the navigator's seat 24. In one specific but non-limiting example, the front ventilation opening 59 may be provided on the toe board 17 that is located at the feet of the occupant when the occupant is seated on the navigator's seat 24. For example, the front ventilation opening 59 may be disposed at a position lower than the position of the seating section 41 (the seating surface) of the navigator's seat 24.

The temperature controller 61 may be provided inside the console box 26, and the inner duct 51 may be provided inside the console box 26 accordingly as with the temperature controller 61, for example. The outer duct 54 may be led out from the console box 26, and extend below the seating section 41 of the navigator's seat 24 to reach the far side of the seating section 41. The front duct 57 may be led out from the console box 26, and extend along the center tunnel 22 toward the front to reach the toe board 17.

[Operation of Air Conditioner]

The air conditioner 2 according to the first configuration example may operate as described below.

Figure 3A:
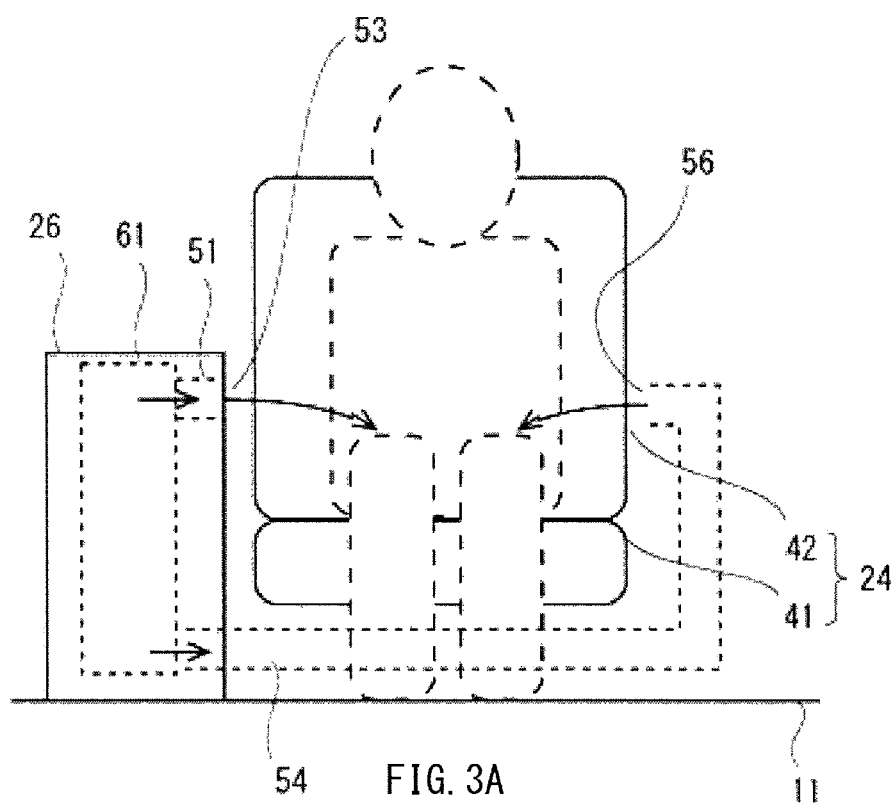
FIG. 3A illustrates a flow of air as seen from the front when the air conditioner illustrated in FIG. 2 is used.
Figure 3B:
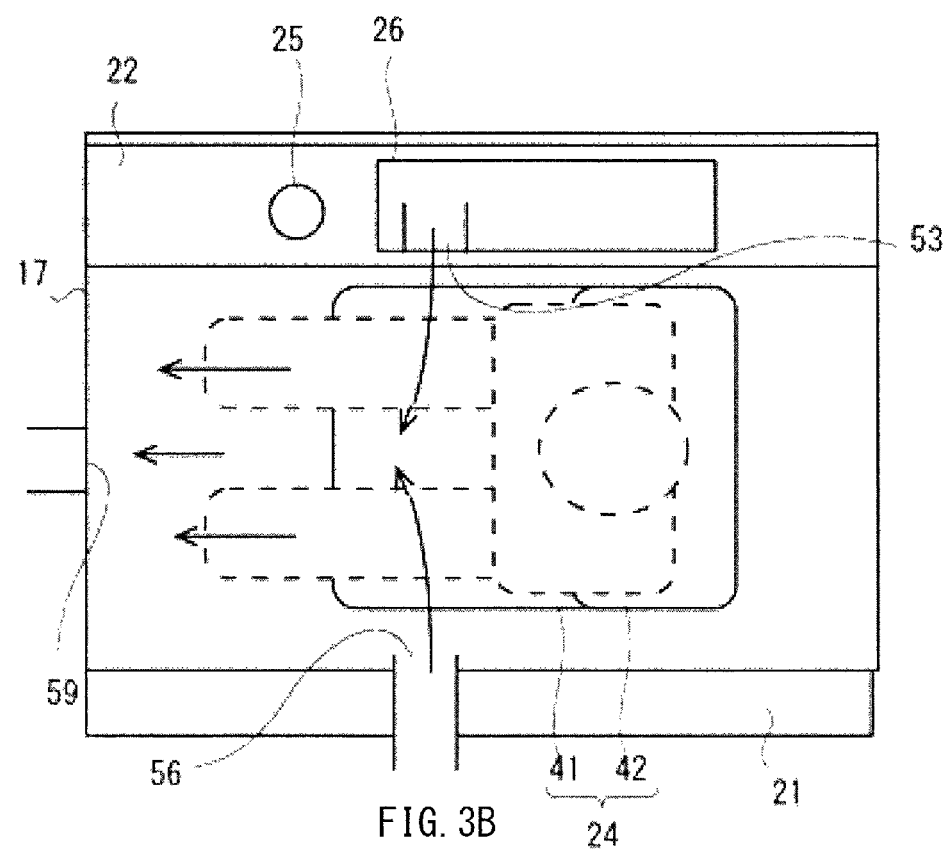
FIG. 3B illustrates the flow of air as seen from the top when the air conditioner illustrated in FIG. 2 is used.

FIG. 3A and FIG. 3B each illustrate a flow of air when the air conditioner 2 according to the first configuration example illustrated in FIG. 2 is used, in which FIG. 3A is a front view of the vehicle 1 and FIG. 3B is a top view of the vehicle 1.

The controller 71 may obtain a temperature detected by the temperature sensor 65. The controller 71 may control the heater 63 to turn on and off the heater 63 such that the heater 63 is at a desired temperature. The controller 71 may control the Peltier device 64 to turn on and off the Peltier device 64 such that the Peltier device 64 is at a desired temperature. A target temperature to be achieved by the control of temperature performed by the controller 71 is not particularly limited as long as a temperature to be felt by the occupant becomes high during winter season, and as long as the temperature to be felt by the occupant becomes low during summer season. For example, the target temperature where heating is required, such as the winter season, may be about 20 degrees centigrade.

The controller 71 may operate each of the inner fan 52, the outer fan 55, and the front fan 58 in accordance with a user's operation to start an air-conditioning control. Upon the air-conditioning control, the controller 71 may cause each of the inner fan 52, the outer fan 55, and the front fan 56 to rotate at low speed.

The speed of rotation of the inner fan 52 may be so set that a flow rate of an airflow to be discharged from the inner duct 51 falls within a range from 0.01 meters per second to 6 meters per second, without limitation. The speed of rotation of the outer fan 55 may be so set that a flow rate of an airflow to be discharged from the outer duct 54 falls within a range from 0.01 meters per second to 6 meters per second, without limitation. Setting each of the flow rates to be equal to or less than 6 meters per second in this way makes it possible to keep a decrease in the temperature to be felt by the occupant owing to those airflows by about one degree centigrade or less.

The speed of rotation of the front fan 58 may be so set as to be a speed that corresponds to a total of the flow rates, namely, the flow rate that corresponds to the speed of rotation of the inner fan 52 as described above and the flow rate that corresponds to the speed of rotation of the outer fan 55 as described above, without limitation. This makes it possible to generate a weak airflow that travels from the inner fan 52 to the front fan 58 and a weak airflow that travels from the outer fan 55 to the front fan 58. To set the speed of rotation of the front fan 58 such that a flow rate of the airflow to be introduced into the front duct 57 falls within a range from 0.01 meters per second to 6 meters per second, it is preferable, without limitation, that the speed of rotation of the inner fan 52, i.e., the flow rate of the airflow to be discharged from the inner duct 51, be kept even lower, and that the speed of rotation of the outer fan 55, i.e., the flow rate of the airflow to be discharged from the outer duct 54, be kept even lower. It is also preferable, without limitation, that the speed of rotation of the inner fan 52, i.e., the flow rate of the airflow to be discharged from the inner duct 51, be the same as the speed of rotation of the outer fan 55, i.e., the flow rate of the airflow to be discharged from the outer duct 54. In an alternative implementation, however, the speed of rotation of the inner fan 52, i.e., the flow rate of the airflow to be discharged from the inner duct 51, may be different from the speed of rotation of the outer fan 55, i.e., the flow rate of the airflow to be discharged from the outer duct 54.

With this configuration, the airflow having been subjected to temperature adjustment by the temperature controller 61 may be discharged from the inner ventilation opening 53, and the airflow having been subjected to temperature adjustment by the temperature controller 61 may be discharged from the outer ventilation opening 56. The airflows discharged from the inner ventilation opening 53 and the outer ventilation opening 56 so travel toward the seating section 41 as to fall onto the seating section 41 to be merged above the seating surface of the seating section 41. The thus-merged airflows may remain above the seating surface.

To achieve the merging and the remaining of the airflows, it is preferable, without limitation, that the flow rate of the airflow to be discharged from the inner ventilation opening 53 and the flow rate of the airflow to be discharged from the outer ventilation opening 56 each be at a velocity that allows the airflow to so travel toward the seating section 41 as to fall onto the seating section 41 after the airflow is discharged from each of the inner ventilation opening 53 and the outer ventilation opening 56. The details on the flow rate of each of the airflows are as described above.

The front ventilation opening 59 may introduce the airflow discharged from each of the inner ventilation opening 53 and the outer ventilation opening 56, i.e., may take in the air present in front of the seating section 41 of the navigator's seat 24. Thus, the air remaining above the seating surface of the seating section 41 may travel to the front along the seating surface, following which the air may further travel to the front of the seating section 41 to thereby travel toward the front ventilation opening 59.

The air conditioner 2 may discharge the weak airflows from the both sides in the width direction of the navigator's seat 24 (the seating section 41) in this manner, making it possible to generate the air that remains above the seating surface of the seating section 41 and cause the airflow that remains above the seating surface to travel slowly toward the front of the seating section 41. This in turn generates an airflow that slowly travels along the lower body of the occupant seated on the navigator's seat 24 from the femoral part to the toes, making it possible to so form a layer of air whose temperature has been adjusted as to cover the lower body of the occupant as a whole by means of that airflow.

[Workings and Effects of Air Conditioner]

The air conditioner 2 according to the first configuration example as described above may discharge the weak airflow from each of the inner ventilation opening 53 and the outer ventilation opening 56 by providing the inner ventilation opening 53 and the outer ventilation opening 56 on the both sides in the width direction of the navigator's seat 24 (the seating section 41). This makes it easier for the low-speed airflow discharged from the inner ventilation opening 53 and the low-speed airflow discharged from the outer ventilation opening 56 to remain above the seating surface of the seating section 41 after those airflows are merged above the seating section 41 (the seating surface). The airflow that remains above the seating surface is supplied to the femoral part of the occupant seated on the navigator's seat 24 and remains in the vicinity of the femoral part easily. Further, the air conditioner 2 may allow the front ventilation opening 59 to introduce the airflow weakly by providing the front ventilation opening 59 in front of the navigator's seat 24 (the seating section 41). Hence, the airflow that remains above the seating surface travels toward the front of the navigator's seat 24.

As a result, the airflow travels along the lower body of the occupant seated on the navigator's seat 24 and hence travels from the femoral part to the toes of the occupant, meaning that the lower body as a whole including the femoral part, knees, shins, ankles, and toes of the occupant is covered with the temperature-adjusted airflow. Thus, the temperature to be felt by the lower body of the occupant as a whole is adjusted both evenly on right and left sides and totally, making it possible to suppress an occurrence of cold lower body such as the cold femoral part of the occupant totally. Hence, it is possible to adjust the temperature to be felt by the occupant while restraining a sense of discomfort given to the occupant.

It is to be noted that, owing to the utilization of the slow, weak airflow, an excessive deprivation of heat from the occupant attributed to the airflow is suppressed as compared with a case where a fast, strong airflow is utilized. However, even upon the utilization of the slow, weak airflow, a temperature of the airflow may be adjusted to prevent the heat from being deprived excessively from the occupant when the excessive deprivation of heat from the occupant may possibly occur due to that airflow.

It is to be also noted that the airflow may travel toward the front of the navigator's seat 24 after the airflow travels toward the navigator's seat 24 from the both sides in the width direction, making it difficult for the airflow to travel along the upper body of the occupant to reach the head or any surrounding part of the head unlike a case where an airflow travels toward the occupant from the front of the occupant. Hence, it makes it difficult for the airflow to be blown onto the face of the occupant, and thereby makes it difficult to give the occupant a sense of discomfort.

In particular, the console box 26 may be provided on the first side of the navigator's seat 24 and the inner ventilation opening 53 may be provided on the side face of the console box 26 in the air conditioner 2 according to the first configuration example. This configuration makes it possible to easily provide the inner ventilation opening 53 at a position higher than a position of the femoral part of the occupant seated on the navigator's seat 24 by taking advantage of a height of the console box 26.

The temperature controller 61 may allow for warming and the cooling of the air, and may be provided inside the console box 26. This configuration sufficiently reduces a distance from the temperature controller 61 to the inner ventilation opening 53, i.e., reduces a length of the inner duct 51, and also sufficiently reduces a distance from the temperature controller 61 to the outer ventilation opening 56, i.e., reduces a length of the outer duct 54. Thus, it is possible to sufficiently suppress a heat loss in each of the inner duct 51 and the outer duct 54. Further, providing the temperature controller 61 inside the console box 26 allows for installation of the temperature controller 61 unexposed around the navigator's seat 24.

The airflow discharged from each of the inner ventilation opening 53 and the outer ventilation opening 56 may be introduced into the front ventilation opening 59, following which the airflow introduced into the front ventilation opening 59 may travel through the front duct 57 to return to the temperature controller 61. This configuration allows the airflow to circulate around the navigator's seat 24, making it possible to suppress an amount of heat required to adjust the temperature of the airflow again. It is also possible to significantly reduce the total amount of heat required to continuously adjust the temperature of the airflow upon continuous operation of the temperature controller 61.

Hence, it is possible to reduce an amount of energy to be used for the air conditioning, without impairing comfort derived from a factor such as the temperature to be felt by the occupant.

[1-2. Second Configuration Example]

A description is given next of the air conditioner 2 according to a second configuration example.

The air conditioner 2 according to the second configuration example differs from the air conditioner 2 according to the foregoing first configuration example, in that the navigator's seat 24 has both the inner ventilation opening 53 and the outer ventilation opening 56. A configuration and an operation of the air conditioner 2 according to the second configuration example are similar to those of the air conditioner 2 according to the first configuration example, with the exception of a configuration and an operation to be described below.

In the following, a description is mainly given on differences between the air conditioner 2 according to the second configuration example and the air conditioner 2 according to the first configuration example. For description purpose, reference numerals same as those used to describe the air conditioner 2 according to the first configuration example are used to refer to the like elements.

Figure 4:
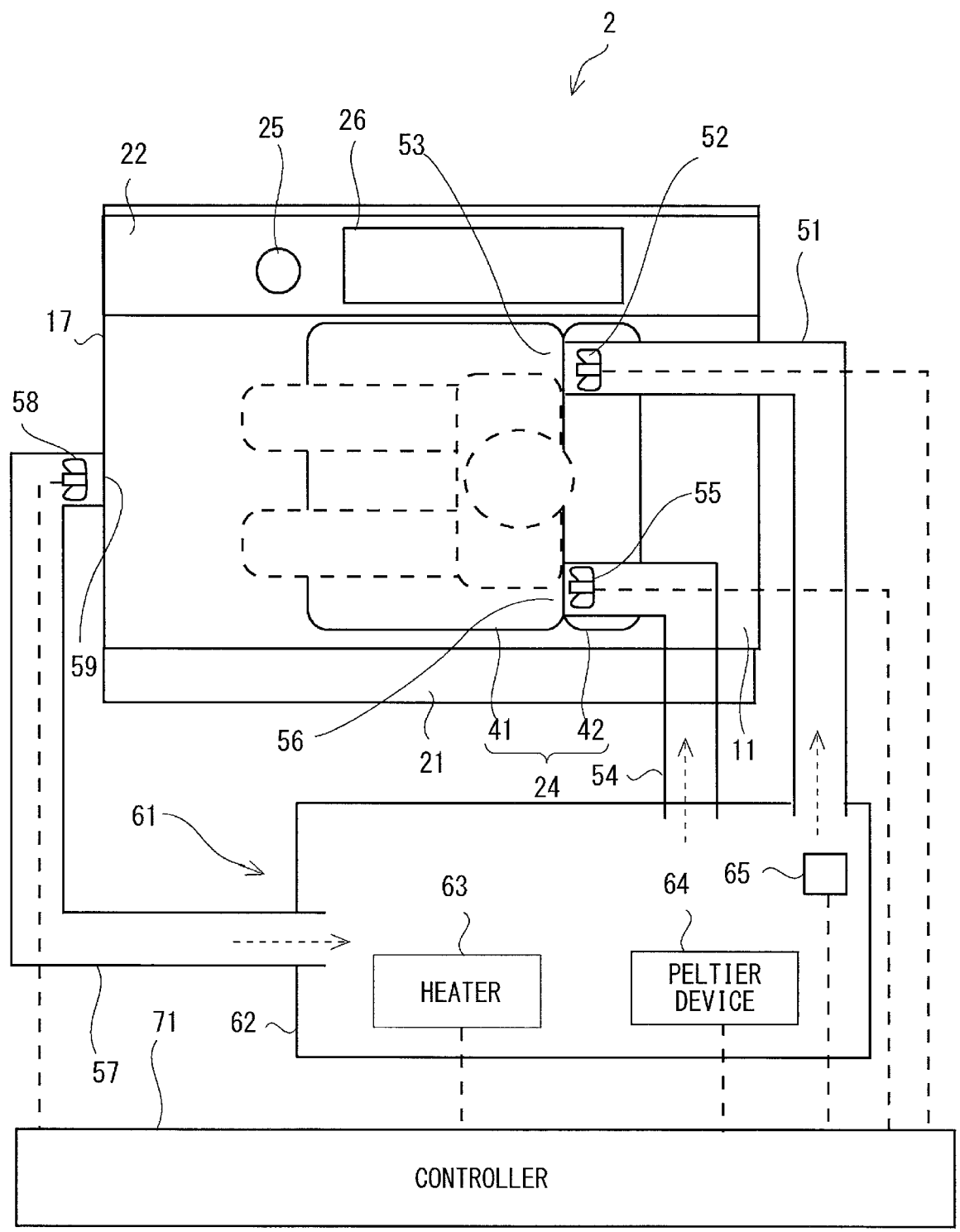
FIG. 4 is a top view of a configuration of the air conditioner according to the first implementation (a second configuration example) of the technology.

FIG. 4 illustrates a configuration of the air conditioner 2 according to the second configuration example and corresponds to FIG. 2. In other words, a flow of air illustrated in FIG. 4 is substantially similar to that illustrated in FIG. 2.

For example, the inner ventilation opening 53 may be disposed at a location that is on the first side in the width direction of the navigator's seat 24, and that is on the backrest section 42 of the navigator's seat 24. For example, the outer ventilation opening 56 may be disposed at a location that is on the second side in the width direction of the navigator's seat 24, and that is on the backrest section 42 of the navigator's seat 24. The backrest section 42 may have a pair of protrusions so protruded toward the front as to support the waist of the occupant while sandwiching the waist from right and left sides. It is preferable, without limitation, that the inner ventilation opening 53 be provided on one of the protrusions, and that the outer ventilation opening 56 be provided on the other of the protrusions. The inner duct 51 and the outer duct 54 each may be led out from the console box 26, and so extend as to reach the backrest section 42 of the navigator's seat 24.

In the air conditioner 2 according to the second configuration example, the inner ventilation opening 53 and the outer ventilation opening 56 may be so provided on the backrest section 42 of the navigator's seat 24 that the inner ventilation opening 53 and the outer ventilation opening 56 are disposed on the both sides in the width direction of the navigator's seat 24. The configuration according to the second configuration example also causes the weak airflow to be discharged from each of the inner ventilation opening 53 and the outer ventilation opening 56, and causes the weak airflow to be introduced into the front ventilation opening 59, making it possible to allow the lower body as a whole including the femoral part, knees, shins, ankles, and toes of the occupant seated on the navigator's seat 24 to be covered with the temperature-adjusted airflow. Thus, the temperature to be felt by the lower body of the occupant as a whole is adjusted both evenly on right and left sides and totally, making it possible to suppress an occurrence of cold lower body such as the cold femoral part of the occupant totally. Hence, as with the air conditioner 2 according to the first configuration example, it is possible to adjust the temperature to be felt by the occupant while restraining a sense of discomfort given to the occupant.

The air conditioner 2 according to the second configuration example provides both the inner ventilation opening 53 and the outer ventilation opening 56 on the backrest section 42 of the navigator's seat 24 as described above. In an alternative implementation, however, one of the inner ventilation opening 53 and the outer ventilation opening 56 may be provided separately from the navigator's seat 24 as illustrated in FIG. 2. For example, the inner ventilation opening 53 may be provided on the console box 26 or any other location other than the navigator's seat 24 as with the air conditioner 2 according to the first configuration example.

[1-3 Third Configuration Example]

A description is given next of the air conditioner 2 according to a third configuration example.

The air conditioner 2 according to the third configuration example differs from the air conditioner 2 according to the foregoing first configuration example an operation of the outer fan 55. The outer fan 55 may be controlled by the controller 71 to introduce the airflow from the outer ventilation opening 56. A configuration and an operation of the air conditioner 2 according to the third configuration example are similar to those of the air conditioner 2 according to the first configuration example, with the exception of a configuration and an operation to be described below.

In the following, a description is mainly given on differences between the air conditioner 2 according to the third configuration example and the air conditioner 2 according to the first configuration example. For description purpose, reference numerals same as those used to describe the air conditioner 2 according to the first configuration example are used to refer to the like elements.

Figure 5:
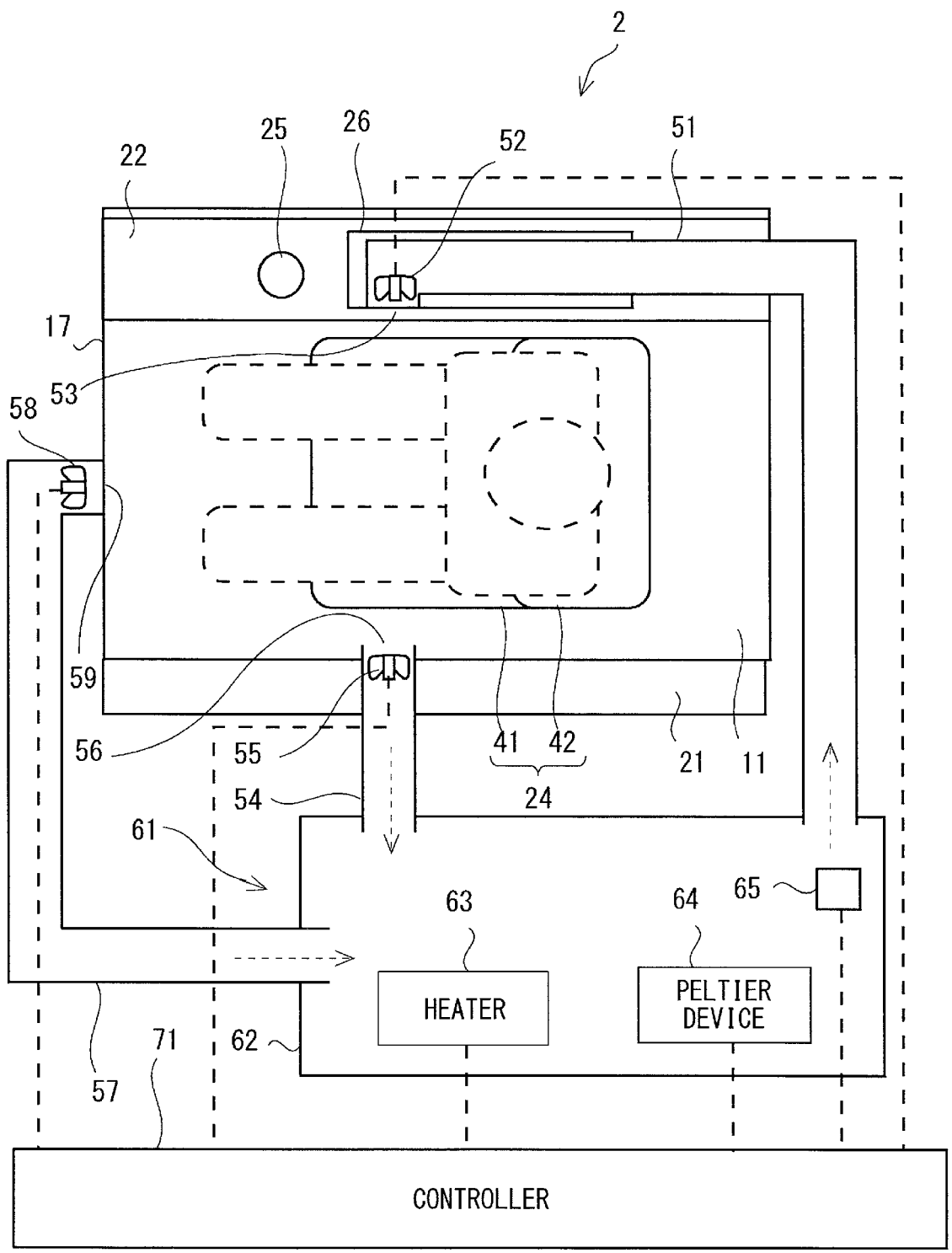
FIG. 5 is a top view of a configuration of the air conditioner according to the first implementation (a third configuration example) of the technology.
Figure 6A:
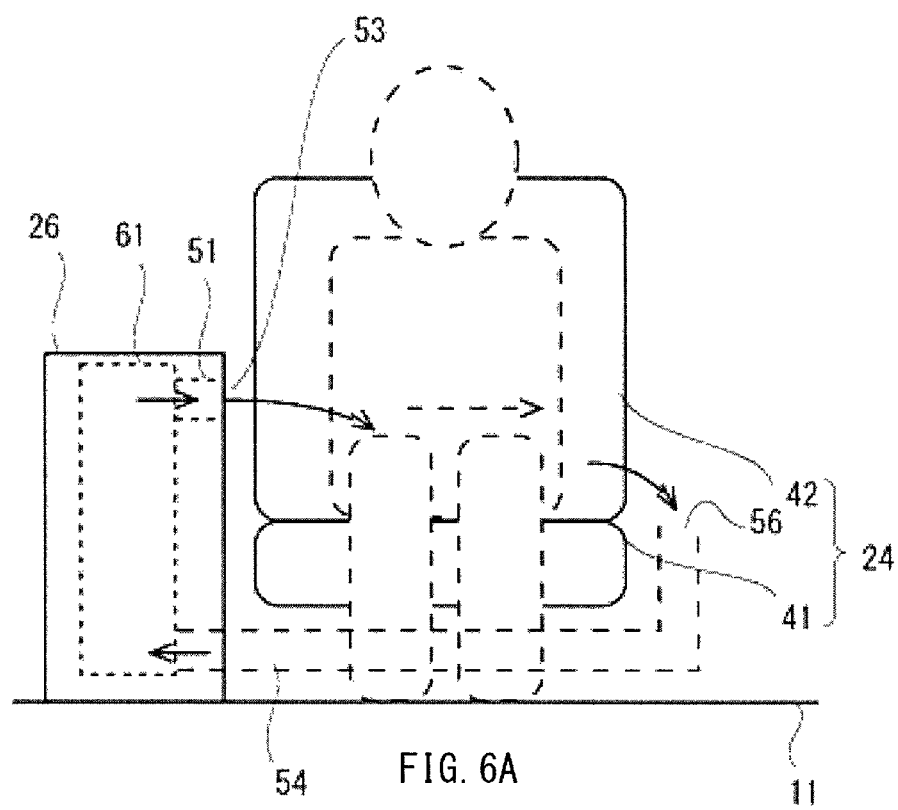
FIG. 6A illustrates a flow of air as seen from the front when the air conditioner illustrated in FIG. 5 is used.
Figure 6B:
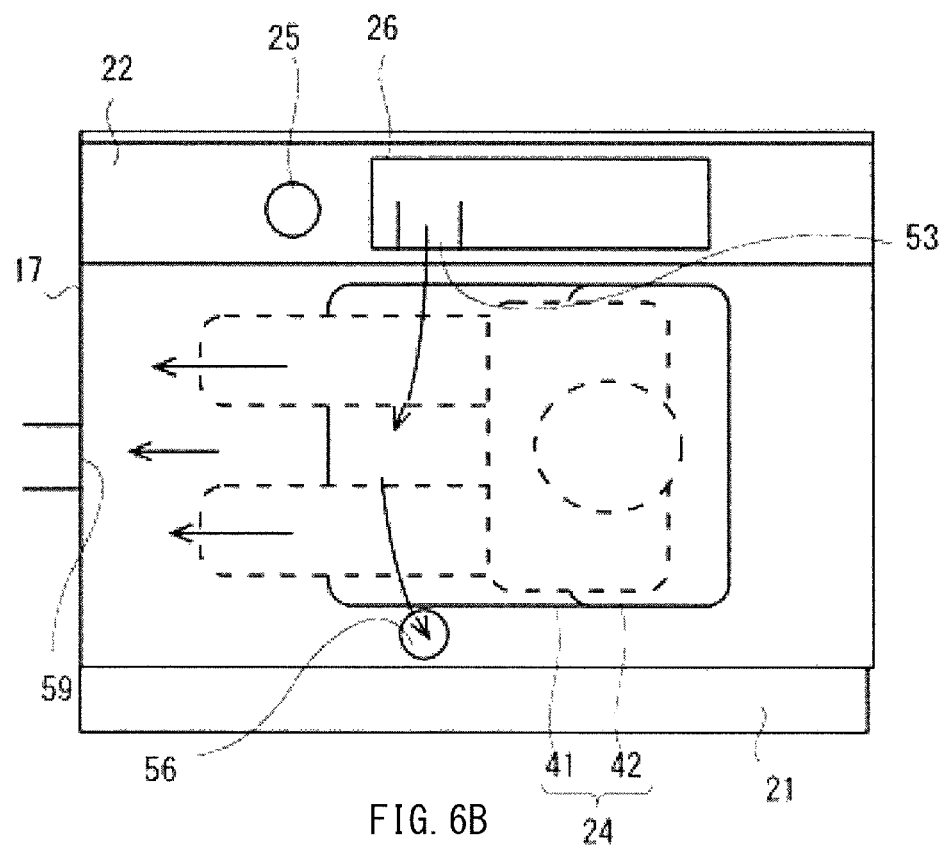
FIG. 6B illustrates the flow of air as seen from the top when the air conditioner illustrated in FIG. 5 is used.

FIG. 5 illustrates a configuration of the air conditioner 2 according to the third configuration example and corresponds to FIG. 2. FIG. 6A and FIG. 6B each illustrate a flow of air when the air conditioner 2 illustrated in FIG. 5 is used, and correspond respectively to FIG. 3A and FIG. 3B.

The controller 71 may operate the inner fan 52 at low speed, causing the inner duct 51 to discharge the weak airflow from the inner ventilation opening 53. The controller 71 may also operate each of the outer fan 55 and the front fan 58 at low speed, causing the outer duct 54 to introduce the airflow, discharged from the inner duct 51, from the outer ventilation opening 56 and causing the front duct 57 to introduce the airflow, discharged from the inner duct 51, from the front ventilation opening 59.

With this configuration, a flow of air is generated between the inner ventilation opening 53 and the outer ventilation opening 56 and between the inner ventilation opening 53 and the front ventilation opening 59. More specifically, the inner duct 51 may discharge the airflow from the inner ventilation opening 53 and the outer duct 54 may introduce the airflow from the outer ventilation opening 56, thereby generating the flow of air between the inner ventilation opening 53 and the outer ventilation opening 56 in front of the occupant seated on the navigator's seat 24. Further, the front duct 57 may introduce the airflow from the front ventilation opening 59, thereby causing a part of the air that flows between the inner ventilation opening 53 and the outer ventilation opening 56 to move toward the front ventilation opening 59.

The speed of rotation of the inner fan 52 may be so set that a flow rate of the airflow to be discharged from the inner duct 51 falls within a range from 0.01 meters per second to 6 meters per second, without limitation. The speed of rotation of each of the front fan 58 and the outer fan 55 may be so set that a total of the flow rates, namely, the flow rate of the airflow to be introduced by the front duct 57 and the flow rate of the airflow to be introduced by the outer duct 54, corresponds to the flow rate of the airflow to be discharged by the inner duct 51, without limitation. Setting each of the flow rates in this way makes it possible to generate the weak airflow that travels toward the outer fan 55 from the inner fan 52 and the weak airflow that travels toward the front fan 58 from the inner fan 52. To increase intake performance of the front ventilation opening 59 that is separated away from the outer ventilation opening 56, the speed of rotation of the front fan 58, i.e., the flow rate of the airflow to be introduced by the front duct 57, may be made higher than the speed of rotation of the outer fan 55, i.e., the flow rate of the airflow to be introduced by the outer duct 54.

In the air conditioner 2 according to the third configuration example, the outer duct 54 may introduce the weak airflow from the outer ventilation opening 56, thereby generating the weak airflow from the inner ventilation opening 53 toward the outer ventilation opening 56, i.e., generating, in front of the occupant seated on the navigator's seat 24, the weak airflow that flows along the upper body and the lower body including the femoral part of the occupant. Further, the front duct 57 provided in front of the navigator's seat 24 weakly introduces the airflow from the front ventilation opening 59. Thus, the configuration according to the third configuration example causes the airflow that travels above the seating section 41 of the navigator's seat 24 to travel from a region above the seating section 41 toward the front, making it possible to allow the lower body as a whole including the femoral part, knees, shins, ankles, and toes of the occupant to be covered with the temperature-adjusted airflow. Thus, the temperature to be felt by the lower body of the occupant as a whole is adjusted both evenly on right and left sides and totally, making it possible to suppress an occurrence of cold lower body such as the cold femoral part of the occupant totally. Hence, as with the air conditioner 2 according to the first configuration example, it is possible to adjust the temperature to be felt by the occupant while restraining a sense of discomfort given to the occupant.

[1-4. Fourth Configuration Example]

A description is given next of the air conditioner 2 according to a fourth configuration example.

The air conditioner 2 according to the fourth configuration example differs from the air conditioner 2 according to the foregoing first configuration example, in that the front ventilation opening 59 is provided at a lower part of the dashboard 18. A configuration and an operation of the air conditioner 2 according to the fourth configuration example are similar to those of the air conditioner 2 according to the first configuration example, with the exception of a configuration and an operation to be described below.

In the following, a description is mainly given on differences between the air conditioner 2 according to the fourth configuration example and the air conditioner 2 according to the first configuration example. For description purpose, reference numerals same as those used to describe the air conditioner 2 according to the first configuration example are used to refer to the like elements.

Figure 7:
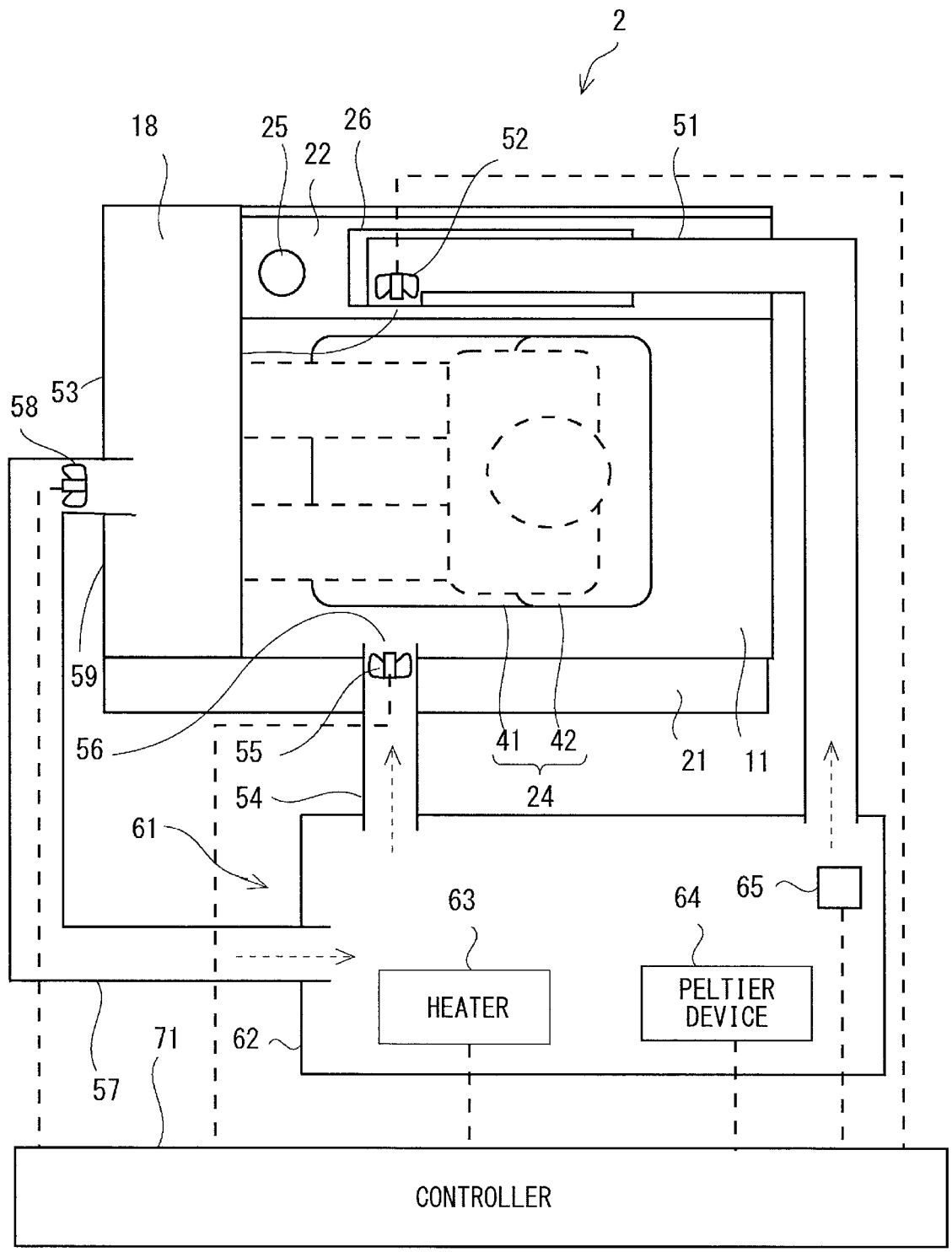
FIG. 7 is a lop view of a configuration of the air conditioner according to the first implementation (a fourth configuration example) of the technology.

FIG. 7 illustrates a configuration of the air conditioner 2 according to the fourth configuration example and corresponds to FIG. 2. In other words, a flow of air illustrated in FIG. 7 is substantially similar to that illustrated in FIG. 2.

For example, the front ventilation opening 59 may be provided at a lower part of the dashboard 18 that is disposed above the toe board 17. The lower part of the dashboard 18 may be, for example, a lower face of the dashboard 18. The front duct 57 may be led out from the unit box 62 and extend to the dashboard 18.

In the air conditioner 2 according to the fourth configuration example, the front ventilation opening 59 is provided at the lower part of the dashboard 18, making it possible to so form a layer of air as to cover the lower body of the occupant seated on the navigator's seat 24 as a whole by means of the airflow, as with the examples in which the front ventilation opening 59 is provided on the toe board 17. Further, the front ventilation opening 59 is provided at the lower part of the dashboard 18 which is above the toe board 17 and less visible to the occupant, making it possible to provide the front ventilation opening 59 without giving an impact on an interior design of the occupant compartment. Moreover, in the air conditioner 2 according to the fourth configuration example, the front ventilation opening 59 is provided on the dashboard 18 that serves as an interior member of the vehicle 1 instead of providing the front ventilation opening 59 on the toe board 17 that serves as a component of the vehicle 1 itself, making it possible to provide the front ventilation opening 59 easily without giving an impact on property such as rigidity of the vehicle 1. Hence, as with the air conditioner 2 according to the first configuration example, it is possible to adjust the temperature to be felt by the occupant while restraining a sense of discomfort given to the occupant.

In an alternative implementation, the front ventilation opening 59 may be provided at any location other than the foregoing dashboard 18, such as the side sills 21 and the floor panel 11. It is preferable, however, that measures be taken to prevent raindrops and dusts from entering inside the front duct 57 easily when providing the front ventilation opening 59 at the side sills 21, the floor panel 11, or any other location. It is also preferable that measures be taken to prevent the front ventilation opening 59 from being conspicuous to the occupants and so as not to give an impact on the interior design of the occupant compartment accordingly, especially when providing the front ventilation opening 59 at a middle part or a rear end part of any side sill 21 instead of providing the front ventilation opening 59 at a front end part of any side sill 21.

[2. Vehicle Air Conditioner (Second Implementation)]

A description is given next of a vehicle air conditioner according to a second implementation of the technology. The air conditioner may have any one of configurations to be described in first and second configuration examples as follows.

[2-1. First Configuration Example]

First, a description is given of an air conditioner 102 according to a first configuration example.

[Configuration of Vehicle to which Air Conditioner is Applied]

A vehicle 101 to which the air conditioner 102 according to the first configuration example is applied may include a configuration as described below.

Figure 8A:
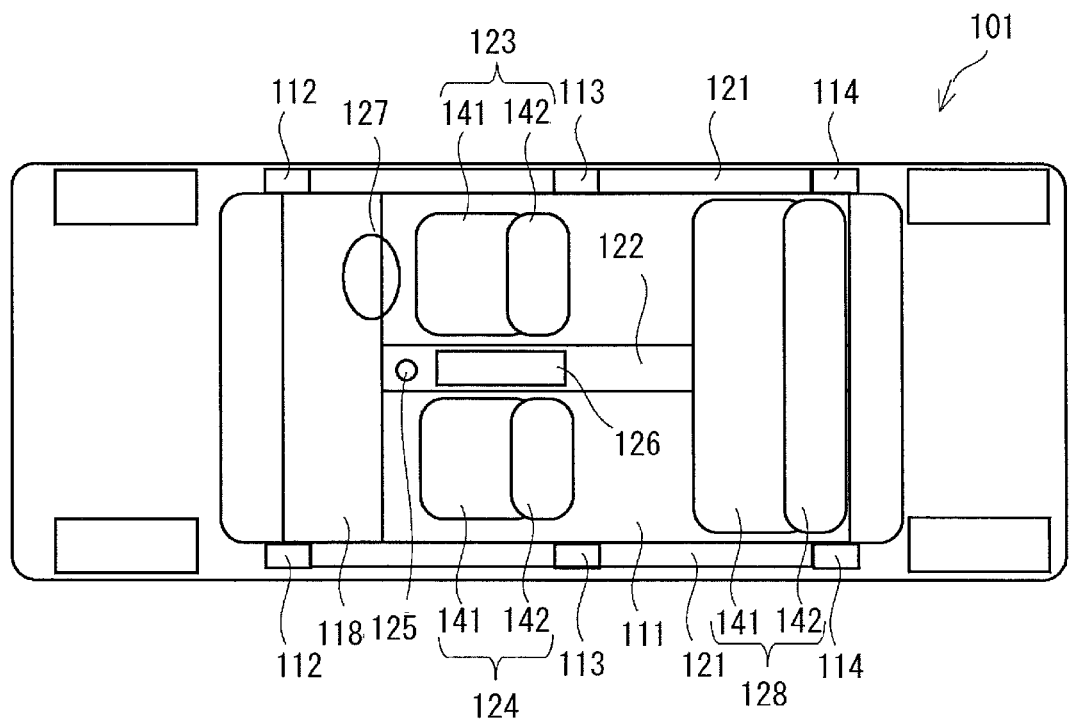
FIG. 8A is a schematic top view of a configuration of a vehicle to which an air conditioner according to a second implementation (a first configuration example) of the technology is applied.
Figure 8B:
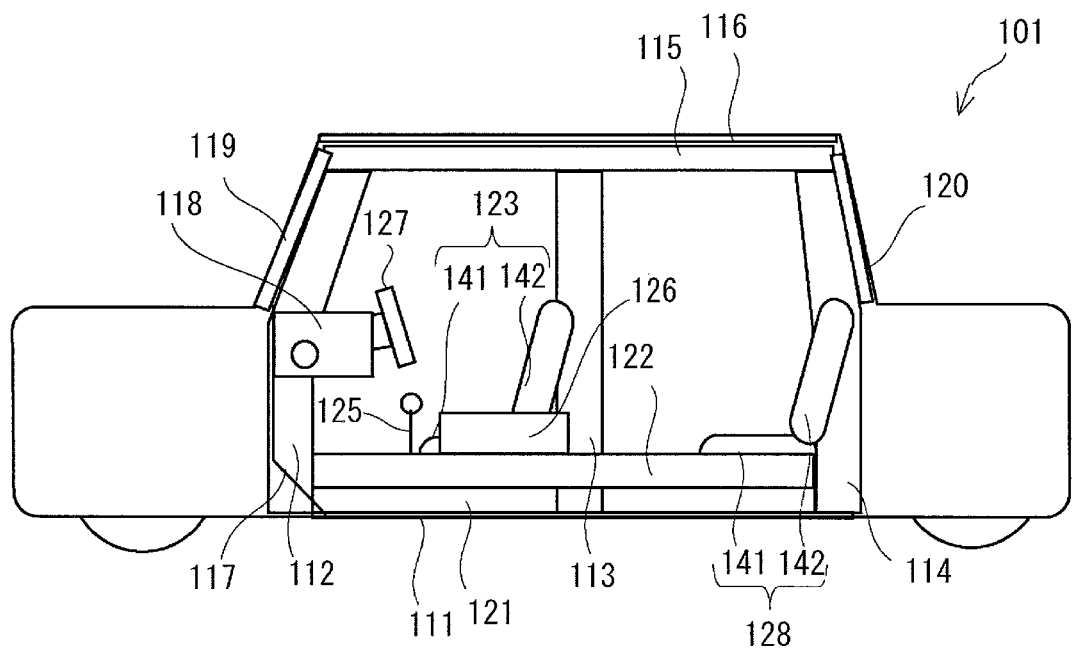
FIG. 8B is a schematic side view of the configuration of the vehicle to which the air conditioner according to the second implementation (the first configuration example) of the technology is applied.

FIG. 8A and FIG. 8B each schematically illustrate a configuration of the vehicle 101 to which the air conditioner 102 according to the first configuration example is applied, in which FIG. 8A is a top view of the vehicle 101 and FIG. 8B is a side view of the vehicle 101. Note that definitions on directions and dimensions are similar to those of the first implementation as described above.

The vehicle 101 may have a configuration substantially similar to the configuration of the vehicle 1 described in the first implementation with reference to FIGS. 1A and 1B.

The vehicle 101 may include the occupant compartment, the front chamber, and the rear chamber. The occupant compartment may include a floor panel 111, a pair of A-pillars 112, a pair of B-pillars 113, and a pair of C-pillars 114. The pair of A-pillars 112 and the pair of C-pillars 114 may be coupled to each other through a pair of roof rails 115. A roof panel 116 may be joined to the roof rails 115.

For example, a toe board 117 may be disposed between the floor panel 111 and the pair of A-pillars 112, and a dashboard 118 may be disposed above the toe board 117. A windshield 119 may be fitted in space surrounded by the dashboard 118, the pair of A-pillars 112, and the roof panel 116. A rear window 120 may be fitted in space between the pair of C-pillars 114. A pair of side sills 121 may be joined to both ends in the width direction of the floor panel 111.

A center tunnel 122 may be provided on the floor panel 111. A drive shaft and any other member may be disposed below the center tunnel 122.

Front seats may be attached to a front part of the floor panel 111. For example, the front seats may include two seats, i.e., a driver's seat 123 and a navigator's seat 124. For example, the driver's seat 123 may include a seating section 141 and a backrest section 142 attached to the seating section 141. The navigator's seat 124 may include the seating section 141 and the backrest section 142 as with the driver's seat 123, for example. The center tunnel 122 described above may be disposed between the driver's seat 123 and the navigator's seat 124. A shift lever 125, a parking brake lever, a console box 126 that serves as an interior member, etc., may be disposed above the center tunnel 122.

For example, the dashboard 118 may be disposed in front of each of the driver's seat 123 and the navigator's seat 124. A steering wheel 127 may be disposed in front of the driver's seat 123.

A rear seat may be attached to a rear part of the floor panel 111. For example, the rear seat may include a single seat, i.e., a bench seat 128. The bench seat 128 may include the seating section 141 and the backrest section 142 as with the driver's seat 123 described above, and may have a width equivalent to a width of the floor panel 111, for example.

As described in the foregoing first implementation, what is needed in an air conditioner for the vehicle is to improve consumption energy of the air conditioner. In particular, an occupant who uses the vehicle tends to feel hot in the upper body such as the neck and the armpit in summer months, for example.

One implementation therefore proposes, as with the foregoing first implementation, the air conditioner 102 (which may be a so-called personal air conditioner) that makes it possible to achieve air conditioning for each occupant, instead of air-conditioning the inside of the occupant compartment provided in the vehicle 101 as a whole. Using the air conditioner 102 makes it possible to reduce a necessity of air-conditioning the inside of the occupant compartment as a whole. Further, combined use of an air conditioner that performs air-conditioning of the inside of the occupant compartment as a whole and the air conditioner 102 according to the implementation allows for a reduction in the consumption energy of the air conditioner 102 as well, owing to a reduction in a burden of performing the air-conditioning of the inside of the occupant compartment as a whole.

[Configuration of Air Conditioner]

The air conditioner 102 according to the first configuration example may have a configuration as described below.

Figure 9:
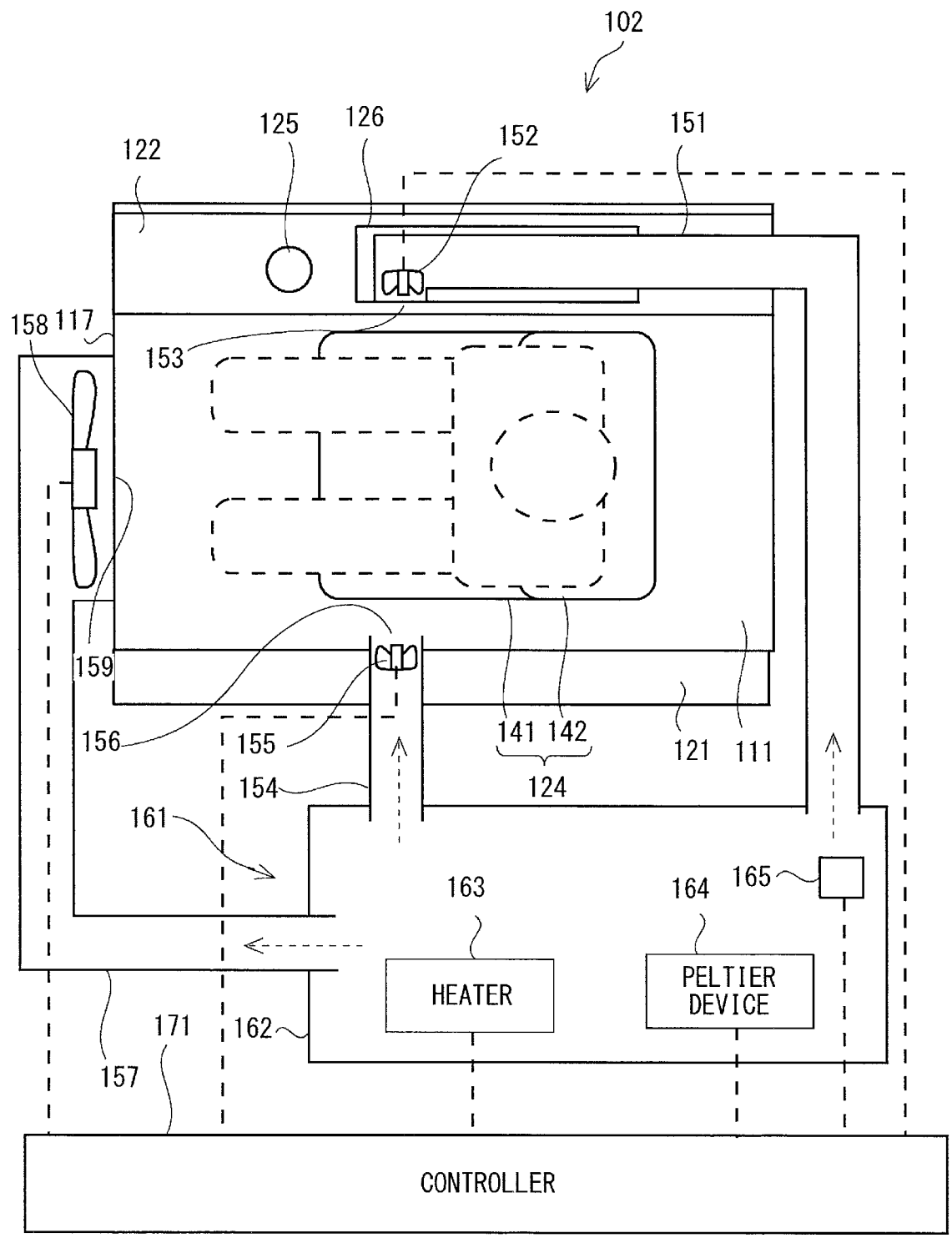
FIG. 9 is a top view of a configuration of the air conditioner according to the second implementation (the first configuration example) of the technology.

FIG. 9 is a top view of the configuration of the air conditioner 102 according to the first configuration example.

The air conditioner 102 may include an inner blow duct 151, an inner blow fan 152, an outer blow duct 154, an outer blow fan 155, a front blow duct 157, a front blow fan 158, a temperature controller 161, and a controller 171. In one implementation of the technology, the inner blow duct 151, the outer blow duct 154, and the front blow duct 157 may respectively serve as a "first duct", a "second duct", and a "third duct".

The temperature controller 161 may have a heater 163, a Peltier device 164, a temperature sensor 165, etc., inside a unit box 162. The heater 163 may heat air inside the unit box 162 by means of electric power of a battery mounted on the vehicle 101. The Peltier device 164 may cool the air inside the unit box 162 by means of the electric power of the battery mounted on the vehicle 101. Details on the temperature controller 161 besides these may be similar to those of the temperature controller 61 described above, for example.

The inner blow duct 151 may include a first end having an inner blow opening 153, and a second end coupled to the unit box 162 of the temperature controller 161. In one implementation of the technology, the inner blow opening 153 may serve as a "first ventilation opening". A wind direction adjuster such as a louver may be provided at the inner blow opening 153. The inner blow fan 152 may be provided inside the inner blow duct 151. For example, the inner blow fan 152 may allow the inner blow duct 151 to take in air at low speed and blow out the air at low speed.

The outer blow duct 154 may include a first end having an outer blow opening 156, and a second end coupled to the unit box 162 of the temperature controller 161. In one implementation of the technology, the outer blow opening 156 may serve as a "second ventilation opening". A wind direction adjuster such as a louver may be provided at the outer blow opening 156. The outer blow fan 155 may be provided inside the outer blow duct 154. For example, the outer blow fan 155 may allow the outer blow duct 154 to take in air at low speed and blow out the air at low speed.

The front blow duct 157 may include a first end having a front blow opening 159, and a second end coupled to the unit box 162 of the temperature controller 161. In one implementation of the technology, the front blow opening 159 may serve as a "third ventilation opening". A wind direction adjuster such as a louver may be provided at the front blow opening 159. The front blow fan 158 may be provided inside the front blow duct 157. For example, the front blow fan 158 may allow the front blow duct 157 to take in air at low speed and blow out the air at low speed.

The controller 171 may control an operation of the air conditioner 102. Details on the controller 171 may be similar to those of the controller 71 described above, for example. The controller 171 may be coupled to the heater 163, the Peltier device 164, the temperature sensor 165, the inner blow fan 152, the outer blow fan 155, the front blow fan 158, etc.

The air conditioner 102 may be provided for each of the seats on which the respective occupants are to be seated, for example. In one implementation, the air conditioner 102 may be provided for the navigator's seat 124.

In one specific but non-limiting example, the inner blow opening 153 may be disposed at a location that is on first side in the width direction of the navigator's seat 124, e.g., on the side close to the console box 126, and that is on a side face of the console box 126, for example. The side face of the console box 126 may be located on the side close to the navigator's seat 124. In other words, the inner blow opening 153 may be provided separately from the navigator's seat 124. For example, the inner blow opening 153 may be disposed at a position higher than a position of the seating section 141 (a seating surface) of the navigator's seat 124.

The outer blow opening 156 may be disposed at a location that is on second side in the width direction of the navigator's seat 124, e.g., on the side far from the console box 126, for example. The outer blow opening 156 may be provided separately from the navigator's seat 124. The outer blow opening 156 may be disposed at a position higher than the position of the seating section 141 (the seating surface) of the navigator's seat 124.

The front blow opening 159 may be disposed in front of the navigator's seat 124. For example, the front blow opening 159 may be provided on the dashboard 118. For example, the front blow opening 159 may be so disposed as to face the rear at a position higher than the position of the seating section 141 (the seating surface) of the navigator's seat 124. The front blow opening 159 may also have a plurality of slits that extend in the width direction. The front blow opening 159 may have a width that corresponds to a width of the navigator's seat 124.

The temperature controller 161 may be provided inside the console box 126, and the inner blow duct 151 may be provided inside the console box 126 accordingly as with the temperature controller 161, for example. The outer blow duct 154 may be led out from the console box 126, and extend below the seating section 141 of the navigator's seat 124 to reach the far side of the seating section 141. The front blow duct 157 may be led out from the console box 126, and extend along the center tunnel 122 to reach the dashboard 118.

[Operation of Air Conditioner]

The air conditioner 102 according to the first configuration example may operate as described below.

Figure 10A:
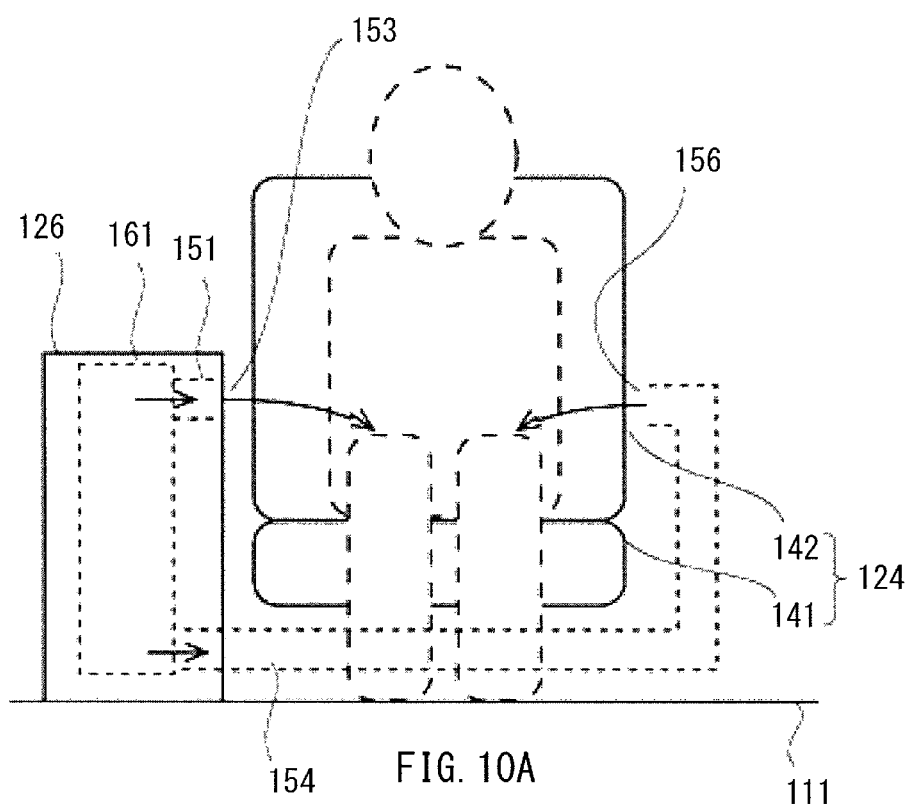
FIG. 10A illustrates a flow of air as seen from the front when the air conditioner illustrated in FIG. 9 is used.
Figure 10B:
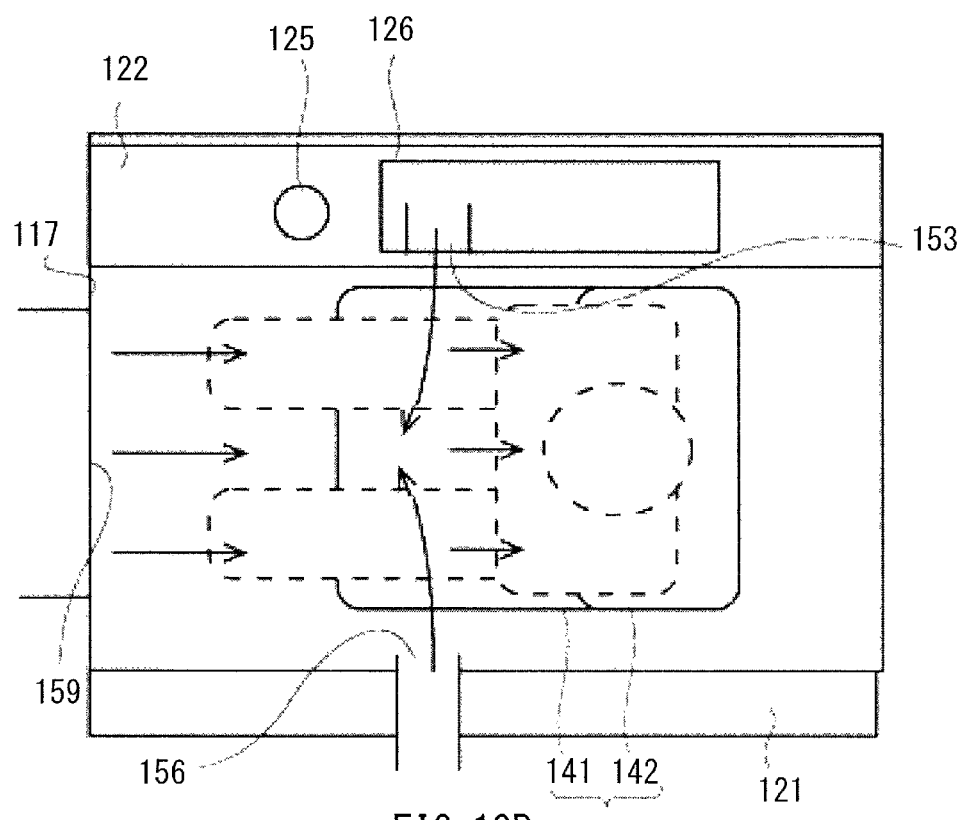
FIG. 10B illustrates the flow of air as seen from the top when the air conditioner illustrated in FIG. 9 is used.

FIG. 10A and FIG. 10B each illustrate a flow of air when the air conditioner 102 according to the first configuration example illustrated in FIG. 9 is used, in which FIG. 10A is a front view of the vehicle 101 and FIG. 10B is a top view of the vehicle 101.

The controller 171 may obtain a temperature detected by the temperature sensor 165. The controller 171 may control the heater 163 to turn on and off the heater 163 such that the heater 163 is at a desired temperature. The controller 171 may control the Peltier device 164 to turn on and off the Peltier device 164 such that the Peltier device 164 is at a desired temperature. A target temperature to be achieved by the control of temperature performed by the controller 171 is not particularly limited as long as a temperature to be felt by the occupant becomes high during winter season, and as long as the temperature to be felt by the occupant becomes low during summer season. For example, the target temperature where heating is required, such as the winter season, may be about 20 degrees centigrade.

The controller 171 may operate each of the inner blow fan 152, the outer blow fan 155, and the front blow fan 158 in accordance with a user's operation to start an air-conditioning control. Upon the air-conditioning control, the controller 171 may cause each of the inner blow fan 152, the outer blow fan 155, and the front blow fan 158 to rotate at low speed. This causes the inner blow duct 151 to discharge, from the inner blow opening 153, a first airflow having been subjected to temperature adjustment by the temperature controller 161, and causes the outer blow duct 154 to discharge, from the outer blow opening 156, a second airflow having been subjected to temperature adjustment by the temperature controller 161. This also causes the front blow duct 157 to discharge, from the front blow opening 159, a third airflow having been subjected to temperature adjustment by the temperature controller 161.

The speed of rotation of the inner blow fan 152 may be so set that a flow rate of the first airflow to be discharged from the inner blow duct 151 falls within a range from 0.01 meters per second to 6 meters per second, without limitation. The speed of rotation of the outer blow fan 155 may be so set that a flow rate of the second airflow to be discharged from the outer blow duct 154 falls within a range from 0.01 meters per second to 6 meters per second, without limitation. Setting each of the flow rates to be equal to or less than 6 meters per second in this way makes it possible to keep a decrease in the temperature to be felt by the occupant owing to the first airflow and the second airflow by about one degree centigrade or less. The low-speed first airflow discharged by the inner blow fan 152 from the inner blow duct 151 and the low-speed second airflow discharged by the outer blow fan 155 from the outer blow duct 154 may be merged in front of the occupant seated on the navigator's seat 124, e.g., merged above the seating section 141, following which the thus-merged airflows may remain in front of the occupant, e.g., merged in the vicinity of the upper body of the occupant.

To achieve the merging and the remaining of the airflows, it is preferable, without limitation, that the flow rate of the first airflow to be discharged from the inner blow opening 153 and the flow rate of the second airflow to be discharged from the outer blow opening 156 each be at a velocity that allows the first airflow and the second airflow to so travel toward the seating section 141 as to fall onto the seating section 141 after the first airflow and the second airflow are respectively discharged from the inner blow opening 153 and the outer blow opening 156. The details on the flow rate of each of the first airflow and the second airflow are as described above.

The controller 171 may also cause the front blow fan 158 to rotate at low speed as described above, making it possible for the front blow duct 157 to discharge the third airflow by the front blow fan 158. A flow rate of the third airflow may be higher than the flow rate of the first airflow to be discharged from the inner blow duct 151 by the inner blow fan 152 and the flow rate of the second airflow to be discharged from the outer blow duct 154 by the outer blow fan 155. For example, the front blow opening 159 may have the width substantially the same as the width of the navigator's seat 124, whereby the third airflow discharged from the front blow opening 159 may so travel toward the rear as to have a width equal to or greater than the width of the navigator's seat 124. Thus, the first airflow and the second airflow both remaining in front of the occupant seated on the navigator's seat 124 may be pushed upward by the third airflow discharged from the front blow opening 159 by the front blow fan 158 to thereby travel toward the upper body of the occupant. The first airflow and the second airflow thus pushed by the third airflow may so travel toward the rear along the upper body of the occupant as to cling to the upper body of the occupant.

In particular, the controller 171 may vary the speed of rotation of the front blow fan 158 within a low-speed range, for example. This allows for switchover of the flow rate of the third airflow to be discharged from the front blow opening 159 by the front blow fan 158 between the flow rate that is higher than the flow rates of the first and the second airflows and a flow rate that is lower than the flow rates of the first and the second airflows. The first airflow may be discharged from the inner blow opening 153 by the inner blow fan 152, and the second airflow may be discharged from the outer blow opening 156 by the outer blow fan 155. The low flow rate allows the first airflow and the second airflow to remain in the front of the occupant seated on the navigator's seat 124, whereas the high flow rate allows the first airflow and the second airflow remaining in front of the occupant to be moved toward the upper body of the occupant.

[Workings and Effects of Air Conditioner]

The air conditioner 102 according to the first configuration example as described above may cause the inner blow duct 151 to discharge the first airflow weakly, and cause the outer blow duct 154 to discharge the second airflow weakly. This allows the first airflow discharged from the inner blow duct 151 and the second airflow discharged from the outer blow duct 154 to merge in from of the upper body of the occupant seated on the navigator's seat 124 to remain in front of the upper body thereafter.

Further, the flow rate of the first airflow to be discharged from the inner blow duct 151 and the flow rate of the second airflow to be discharged from the outer blow duct 154 each may be at the velocity that allows the first airflow and the second airflow to so travel toward the seating section 141 of the navigator's seat 124 as to fall onto the seating section 141 after the first airflow and the second airflow are merged. This makes it easier for the first airflow and the second airflow merged in front of the upper body of the occupant to remain in front of the upper body.

Moreover, the wide third airflow may be discharged weakly from the front blow duct 157 so provided in front of the navigator's seat 124 as to face the navigator's seat 124. Thus, the first airflow and the second airflow both remaining in front of the upper body of the occupant may travel upward along the upper body.

The first airflow and the second airflow both remaining in front of the upper body of the occupant may thereby cling to the upper body, making it possible to effectively supply, toward the upper body such as the neck and the armpit of the occupant, the airflows that remain in front of the upper body of the occupant.

It is to be noted that the weak first airflow discharged from the inner blow duct 151 and the weak second airflow discharged from the outer blow duct 154 may both travel toward the front, whereas the weak third airflow discharged from the front blow duct 157 may travel toward the rear. Thus, the first and the second airflows that travel toward the front and the third airflow that travels toward the rear may merge to slow down speeds at which the first and the second airflows travel toward the front and the rear after the merging, making it difficult for the merged first and second airflows to travel toward the front as well as toward the rear.

As a result, the speed of the first airflow and the speed of the second airflow after the merging are kept down effectively, making it easier for the merged first and second airflows to cling to the upper body of the occupant. Hence, it is possible to supply the upper body such as the neck and the armpit of the occupant with the merged first and second airflows effectively.

Further, the flow rate of the first airflow and the flow rate of the second airflow after the merging are kept down effectively, causing the merged first and second airflows to be weak to a large extent. Hence, it is possible to supply the merged first and second airflows toward the faces, etc., of the occupant while making it difficult for the occupant to feel a sense of discomfort.

Hence, it is possible to adjust the temperature to be felt by the occupant while restraining a sense of discomfort given to the occupant as with the foregoing first implementation.

In particular, the front blow opening 159 of the air conditioner 102 according to the first configuration example may have the width substantially the same as the width of the navigator's seat 124, making it possible to supply sufficiently, toward the upper body of the occupant seated on the navigator's seat 124, the merged first and second airflows by means of the airflow that has the width corresponding to the width of the navigator's seat 124. Hence, it is possible to cause the merged first and second airflows to cling to the upper body of the occupant even more.

The flow rate of the third airflow to be discharged from the front blow duet 157 may be switchable between the flow rate that is higher than the flow rates of the first and the second airflows to be discharged respectively from the inner blow duct 151 and the outer blow duct 154 and the flow rate that is lower than the flow rates of the first and the second airflows. The switchover makes it possible to cause the first airflow discharged from the inner blow duct 151 and the second airflow discharged from the outer blow duct 154 to keep on merging with each other in an intermittent fashion in front of the upper body of the occupant seated on the navigator's seat 124, and cause the merged first and second airflows to be supplied toward the occupant continuously. Hence, it is possible to cause the merged first and second airflows to cling to the upper body of the occupant even more. It is to be noted that causing cooled air to be blown out from each of the inner blow duct 151 and the outer blow duct 154 makes it possible to allow the cooled air to cling to the upper body of the occupant, for example.

The temperature controller 161 may allow for warming and the cooling of the air, and may be provided inside the console box 126. This configuration sufficiently reduces a distance from the temperature controller 161 to the inner blow opening 153, i.e., reduces a length of the inner blow duct 151, and also sufficiently reduces a distance from the temperature controller 161 to the outer blow opening 156, i.e., reduces a length of the outer blow duct 154. Thus, it is possible to sufficiently suppress a heat loss in each of the inner blow duct 151 and the outer blow duct 154. Further, providing the temperature controller 161 inside the console box 126 allows for installation of the temperature controller 161 unexposed around the navigator's seat 124.

Hence, it is possible to reduce an amount of energy to be used for the air conditioning, without impairing comfort derived from a factor such as the temperature to be felt by the occupant.

[2-2. Second Configuration Example]

A description is given next of the air conditioner 102 according to a second configuration example.

The air conditioner 102 according to the second configuration example differs from the air conditioner 102 according to the foregoing first configuration example, in that the navigator's seat 124 has both the inner blow opening 153 and the outer blow opening 156. A configuration and an operation of the air conditioner 102 according to the second configuration example are similar to those of the air conditioner 102 according to the first configuration example, with the exception of a configuration and an operation to be described below.

In the following, a description is mainly given on differences between the air conditioner 102 according to the second configuration example and the air conditioner 102 according to the first configuration example. For description purpose, reference numerals same as those used to describe the air conditioner 102 according to the first configuration example are used to refer to the like elements.

Figure 11:
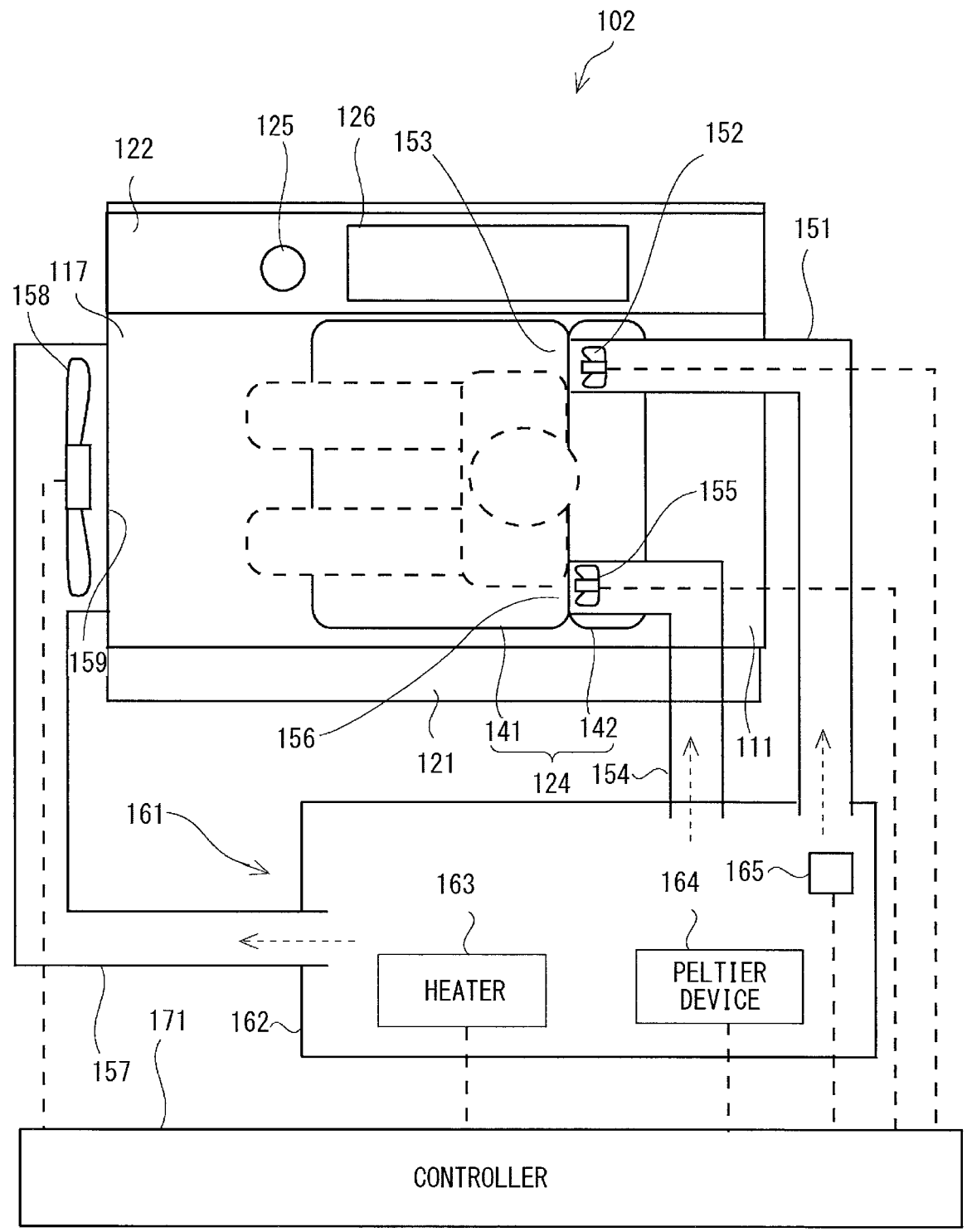
FIG. 11 is a top view of a configuration of the air conditioner according to the second implementation (a second configuration example) of the technology.

FIG. 11 illustrates a configuration of the air conditioner 102 according to the second configuration example and corresponds to FIG. 9. In other words, a flow of air illustrated in FIG. 11 is substantially similar to that illustrated in FIG. 9.

For example, the inner blow opening 153 may be disposed at a location that is on the first side in the width direction of the navigator's seat 124, and that is on the backrest section 142 of the navigator's seat 124. For example, the outer blow opening 156 may be disposed at a location that is on the second side in the width direction of the navigator's seat 124, and that is on the backrest section 142 of the navigator's seat 124. The backrest section 142 may have a pair of protrusions so protruded toward the front as to support the waist of the occupant while sandwiching the waist from right and left sides. It is preferable, without limitation, that the inner blow opening 153 be provided on one of the protrusions, and that the outer blow opening 156 be provided on the other of the protrusions.

In the air conditioner 102 according to the second configuration example, the inner blow opening 153 and the outer blow opening 156 may be so provided on the backrest section 142 of the navigator's seat 124 that the inner blow opening 153 and the outer blow opening 156 are disposed on the both sides in the width direction of the navigator's seat 124. The configuration according to the second configuration example also makes it easier for the first airflow discharged from the inner Now opening 153 and the second airflow discharged from the outer blow opening 156 to merge with each other in front of the upper body of the occupant seated on the navigator's seat 124. Thus, discharging the weak first airflow from the inner blow opening 153, the weak second airflow from the outer blow opening 156, and the weak third airflow from the front blow opening 159 may cause the merged first and second airflows to so travel as to cling to the upper body of the occupant, thereby allowing the upper body of the occupant as a whole to be covered with the temperature-adjusted first and second airflows. Thus, the temperature to be felt by the upper body of the occupant as a whole is adjusted both evenly on right and left sides and totally by means of the temperature-adjusted first and second airflows, making it possible to give warmth and coldness to the upper body such as the neck and the sides. Hence, as with the air conditioner 102 according to the first configuration example, it is possible to adjust the temperature to be felt by the occupant while restraining a sense of discomfort given to the occupant.

The air conditioner 102 according to the second configuration example provides both the inner blow opening 153 and the outer blow opening 156 on the backrest section 142 of the navigator's seat 124 as described above. In an alternative implementation, however, one of the inner blow opening 153 and the outer blow opening 156 may be provided separately from the navigator's seat 124 as illustrated in FIG. 9. For example, the inner blow opening 153 may be provided on the console box 126 or any other location other than the navigator's seat 124 as with the air conditioner 102 according to the first configuration example.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle air conditioner, comprising:
    a first duct having a first ventilation opening that is disposed on a first side in a width direction of a seat provided in a vehicle;
    a second duct having a second ventilation opening that is disposed on a second side in the width direction of the seat, the second side being opposite the first side; and
    a third duct having a third ventilation opening that is disposed in front of the seat,
    wherein the first duct discharges a first airflow, the second duct discharges a second airflow, and the third duct discharges a third airflow,
    the seat includes a seating section, wherein the first airflow and the second airflow merge with each other above the seating section to remain above the seating section, wherein a flow rate of the third airflow is switchable between a flow rate that is higher than a flow rate of each of the first airflow and the second airflow and a flow rate that is lower than the flow rate of each of the first airflow and the second airflow, wherein the first ventilation opening, the second ventilation opening, and the third ventilation opening are disposed at a position higher than the seating section of the seat, wherein the first ventilation opening and the second ventilation opening face each other, and wherein the third ventilation opening faces rearward from in front of the seat towards a rear of the seat, the vehicle air conditioner further comprising a controller configured to control the flow rate of the first airflow, the second air flow and the third air flow, and wherein the controller:

controls the flow rate of each of the first airflow and the second airflow to a predetermined velocity so that the first airflow and the second air flow are merged above the seating section, and at the same time, controls the flow rate of the third air flow to vary between a flow rate that is higher than the predetermined velocity and a flow rate that is lower than the predetermined velocity so that the third air flow is merged into the first airflow and the second airflow above the seating section.

2. The vehicle air conditioner according to claim 1, wherein the third ventilation opening has a width substantially same as a width of the seat.

3. The vehicle air conditioner according to claim 1, further comprising a temperature controller provided inside a console box disposed in the vehicle, wherein the first duct is coupled to the temperature controller, and the first airflow is cooled by the temperature controller, and wherein the second duct is coupled to the temperature controller, and the second airflow is cooled by the temperature controller.

4. The vehicle air conditioner according to claim 2, further comprising a temperature controller provided inside a console box disposed in the vehicle, wherein the first duct is coupled to the temperature controller, and the first airflow is cooled by the temperature controller, and wherein the second duct is coupled to the temperature controller, and the second airflow is cooled by the temperature controller.

5. The vehicle air conditioner according to claim 1, wherein the flow rate of the first airflow is within a range from 0.01 meters per second to 6 meters per second, and wherein the flow rate of the second airflow is within a range from 0.01 meters per second to 6 meters per second.

6. The vehicle air conditioner according to claim 2, wherein the flow rate of the first airflow is within a range from 0.01 meters per second to 6 meters per second, and wherein the flow rate of the second airflow is within a range from 0.01 meters per second to 6 meters per second.

7. The vehicle air conditioner according to claim 3, wherein the flow rate of the first airflow is within a range from 0.01 meters per second to 6 meters per second, and wherein the flow rate of the second airflow is within a range from 0.01 meters per second to 6 meters per second.

8. The vehicle air conditioner according to claim 4, wherein the flow rate of the first airflow is within a range from 0.01 meters per second to 6 meters per second, and wherein the flow rate of the second airflow is within a range from 0.01 meters per second to 6 meters per second.

9. The vehicle air conditioner according to claim 1, wherein the controller controls the flow rate of each of the first airflow and the second airflow to the predetermined velocity so that the first airflow and the second air flow are merged above the seating section at a mid-point of the seating section.

* * * * *